(12) United States Patent
Hickman et al.

(10) Patent No.: US 6,523,036 B1
(45) Date of Patent: Feb. 18, 2003

(54) INTERNET DATABASE SYSTEM

(75) Inventors: Robert C. Hickman, Duvall, WA (US); Jared E. Bobbitt, Seattle, WA (US); Jeffrey C. Tanner, Seattle, WA (US); Patrick Wing Sang Lau, Issaquah, WA (US); Marc T. Friedman, Seattle, WA (US); Joseph P. Mullally, Seattle, WA (US)

(73) Assignee: Dantz Development Corporation, Orinda, CA (US)

( * ) Notice: Subject to any disclaimer, the term of this patent is extended or adjusted under 35 U.S.C. 154(b) by 344 days.

(21) Appl. No.: 09/629,652

(22) Filed: Aug. 1, 2000

(51) Int. Cl.$^7$ ............................................ G06F 17/30
(52) U.S. Cl. ...................................................... 707/10
(58) Field of Search ............................ 707/1, 10, 201; 709/214

(56) References Cited

U.S. PATENT DOCUMENTS

| | | | | |
|---|---|---|---|---|
| 5,555,404 A | * | 9/1996 | Torbjornsen et al. | 707/202 |
| 5,970,495 A | * | 10/1999 | Baru et al. | 707/10 |
| 6,192,359 B1 | * | 2/2001 | Tsuchida et al. | 707/10 |
| 6,230,164 B1 | * | 5/2001 | Rekieta et al. | 707/10 |
| 6,393,466 B1 | * | 5/2002 | Hickman et al. | 707/100 |

OTHER PUBLICATIONS

Chu–Sing Yang et al. "An Effective Mechanism for Supporting Content–Based Routing in Scalable Web Server Clusters" Sep. 1999, 1999 International Workshop on Parallel Processing Procedings, pp 240–245.*

Huican Zhu et al. Adaptive Load Sharing for Clustered Digital Library Services, Jul. 1998, 1998 Proceedings The Seventh International Symposium on High Performance Distributed Computing, pp 235–242.*

* cited by examiner

*Primary Examiner*—Jack Choules
(74) *Attorney, Agent, or Firm*—Blakely, Sokoloff, Taylor & Zafman

(57) ABSTRACT

An incrementally-scalable database system and method. The system architecture enables database servers to be scaled by adding resources, such as additional servers, without requiring that the system be taken offline. Such scaling includes both adding one or more computer servers to a given server cluster, which enables an increase in database read transaction throughput, and adding one or more server clusters to the system configuration, which provides for increased read and write transaction throughput. The system also provides for load balancing read transactions across each server cluster, and load balancing write transactions across a plurality of server clusters. The system architecture includes an application server layer including one or more computers on which an application program(s) is running, a database server layer comprising two or more server clusters that each include two or more computer servers with replicated data, and an intermediate "virtual transaction" layer that includes at least two computers that facilitate database transactions with one or more databases operating in the database server layer. Data in the database(s) are evenly distributed across the server clusters in fragmented mutually exclusive subsets of data based on a hashing function. An application program interface is provided so as to enable application programs to perform a full range of

50 Claims, 12 Drawing Sheets

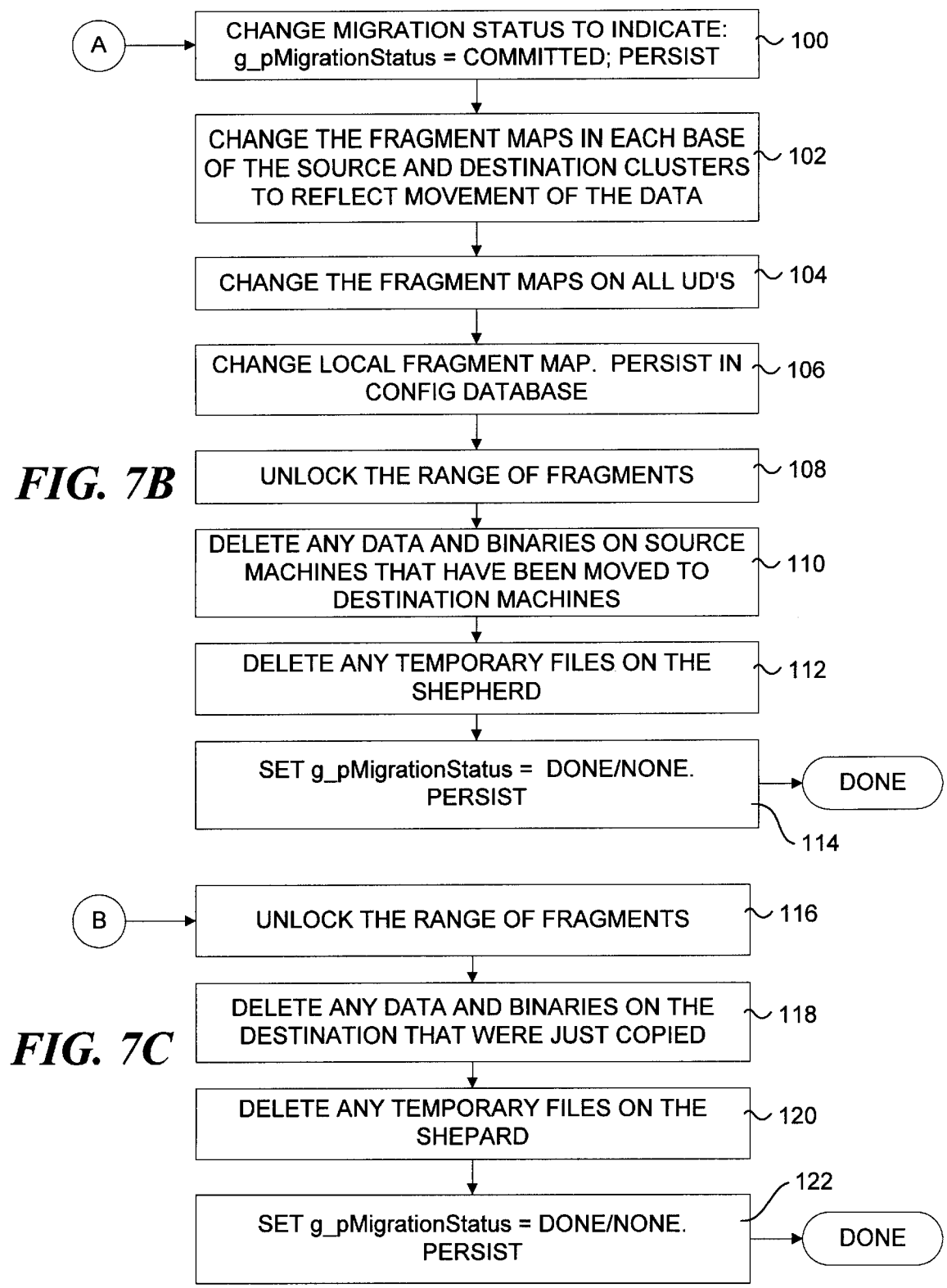

| FRAGMENT | CLUSTER |
|---|---|
| 0 | 1 |
| 1 | 1 |
| ... | ... |
| MAX_FRAGMENTS/2 – 1 | 1 |
| MAX_FRAGMENTS/2 | 2 |
| MAX_FRAGMENTS/2 + 1 | 2 |
| ... | ... |
| MAX_FRAGMENTS – 1 | 2 |

TABLE 4

| FRAGMENT | CLUSTER |
|---|---|
| 0 | 1 |
| 1 | 1 |
| ... | ... |
| 2*MAX_FRAGMENTS/6 – 1 | 1 |
| 2*MAX_FRAGMENTS/6 | 3 |
| ... | |
| 3*MAX_FRAGMENTS/6 – 1 | 3 |
| 3*MAX_FRAGMENTS/6 | 2 |
| ... | |
| 5*MAX_FRAGMENTS/6 – 1 | 2 |
| 5*MAX_FRAGMENTS/6 | 3 |
| ... | |
| 6*MAX_FRAGMENTS/6 – 1 | 3 |

TABLE 12

DATA MIGRATION TO BASES IN NEW CLUSTER

TO & FROM
LOCAL/WIDE AREA
NETWORK/INTERNET

INTERNET DATABASE SYSTEM database transactions without regard for where data is stored, or what database(s) is operating in the database server layer.

BACKGROUND OF THE INVENTION

1. Field of the Invention

The present invention relates to large-scale databases, and more particularly, to a database architecture having incremental scalability and that is adapted for use with Internet database systems.

2. Background Information

The amount of data generated by a typical Internet website is tremendous. There is a need for Internet applications that can store, manipulate, and retrieve large amounts of data. For example, a typical e-commerce website maintains information for each user, such as shipping and billing data, previous shopping experiences and category preferences. Popular websites may have millions of these data records. The explosive growth of Internet data is due to two primary factors. First, as the Internet expands, its reach becomes more pervasive, as more and more users are going online. Second, as Internet applications become more dynamic and personalized, more data are stored about each user. Therefore, data storage solutions become critical pieces of the Internet infrastructure requirements.

The term "netstore" as used herein is defined to be an Internet-scale data store that can handle both the traffic and capacity required by an Internet application. The netstore must have several capabilities. First, the typical number of total users that can access the netstore is extremely large (e.g., greater than 100 million users). Additionally, the typical number of concurrent users is large (e.g., 1 million users). Read operations to the netstore are more prevalent than write operations (e.g., a 10-1 read-to-write ratio for some Internet applications or even 100-1 for others). The netstore must be able to store a large amount of data and should be simple and flexible. Additionally, the data stored therein can be treated as a collection of picks that only has meaning to the particular Internet application.

Traditionally, data storage architectures for Internet applications, such as those that implement netstores, have been built upon relational and object-oriented database management systems (DBMS). These products have been developed primarily for the enterprise domain. However, it has been found that the data handling requirements of the Internet domain are significantly different than the requirements for a typical enterprise domain. Not only does the Internet domain place new demands on a netstore in terms of scalability, reliability and flexibility, the data model itself has changed. Most of these Internet applications require a very simple data model where the need to manage complex interrelationships in the data is deemphasized. Emphasis is instead placed on simplicity and flexibility of the data model. For instance, many Internet applications require the ability to read, write, or modify a single small data record individually.

Current DBMS products are not well suited for Internet applications because they have not been designed to address the distinct problem space presented by Internet applications. Consequently, solutions built using the enterprise DBMS products to address these Internet problems are costly to design, deploy and maintain.

Most of today's Internet sites that have read/write/modify storage requirements use relational database management systems (RDBMS). The reason why these sites choose RDBMS software is primarily one of convenience. There is an abundance of software tools that provide access to RDBMS products from web and application servers, thereby enabling sites to implement their netstores using off-the-shelf software.

In order to create a netstore with an RDBMS, the site must perform the following tasks:

(a) Design the database (i.e., tables, schema, relations, keys, stored procedures, etc.)

(b) Install, tune and maintain the database servers.

(c) Architect a scalable database system that is reliable, fault-tolerant and can handle the load and data required.

(d) Database-enable the web pages through a dynamic web server model. Typical options on Windows NT include: ASP/ADO (scripting) or ISAPI/ODBC (C/C++code). Typical options on Unix include: CGI-BIN/ODBC or NSAPI/ODBC/JDBC.

(e) Database-enable the application servers through custom code such as ODBC or JDBC.

Given the problem domain of enterprise-level database systems, limitations generally arise when they are used in a netstore implementation, since they are designed to be efficient at handling related data, and are not easily scalable. Key limitations with relational database systems used in a netstore environment include high maintenance costs, insufficient performance, poor scalability, and high implementation complexity.

It is therefore desired to provide a scheme that addresses the Internet application space directly through use of a specialized solution that provides a more optimized performance than conventional approaches, such as RDBMS. Preferably, the solution should be highly reliable, highly scaleable, and provide easy migration from existing products.

SUMMARY OF THE INVENTION

The present invention addresses the foregoing desires by providing an incrementally-scalable database system and method. The system architecture implements a netstore as a set of cooperating server machines. This set is divided into clusters, each of which consists of one or more server machines. All machines within a cluster are replicas of one another and store the same data records. The data is partitioned among the clusters, so that each data record in the netstore is stored in exactly one cluster.

This architecture allows for incremental scalability, load balancing, and reliability despite hardware or software failures. The system architecture enables database capacity to be scaled by adding resources, such as additional servers, without requiring that the system be taken offline. Such scaling includes both adding one or more computer servers to a given server cluster, which enables an increase in database read transaction throughput, and adding one or more server clusters to the system configuration, which provides for increased read and write transaction throughput.

The system also provides for load balancing read transactions across each server cluster, and load balancing write transactions across a plurality of server clusters. Read transactions can be served by different replicas at the same time, spreading out the load. For example, if there are 3 servers in a server cluster, approximately ⅓ of the requests will be routed to each machine, allowing for nearly 3 times the potential read transaction throughput of a single server.

Since write requests are routed to a single cluster, adding clusters spreads out the write transaction load, with a similar effect on write throughput.

The system also provides for very high availability (HA) through its use of clustering. Because each of the machines in a server cluster is an identical replica of every other machine in the cluster, if that server fails, the problem is masked from the applications. The failed machine is removed from the system and the other replica servers in the cluster are available to satisfy requests for the failed server, without any impact to the application.

A system implementing the invention includes an application server layer, comprising one or more computers, serving as clients of a data storage layer, comprising of one or more server computers. The application server layer comprises compute servers that host an application program such as a web server. Also included is a scalable database server layer comprising of one or more server clusters, wherein each server cluster includes one or more database servers. Data is stored on the computer servers in the server clusters, wherein the data on each computer server in a given cluster is replicated. Under a typical configuration, the database(s) will comprise an RDBMS database such as a SQL-based database that comprises a plurality of record objects stored in tables defined by the database schema. The table data are partitioned into fragments and distributed across the server clusters such that each server cluster stores approximately an equal amount of record objects. The database server layer also includes a configuration management component that provides other components in the system with up-to-date information about the present configuration of the database server layer. This configuration information includes mapping information (known as the fragment map) that identifies on which server clusters various record objects are stored. The architecture also includes an intermediate "virtual transaction" layer disposed between and in communication with the application server layer and the database server layer that comprises of one or more computers. A database update/distributor transaction module running on each of the computers in the virtual transaction layer coordinates write transactions in a strongly consistent fashion, such that all replicas appear to process a single change simultaneously and instantaneously. This virtual transaction layer also enables load balancing of database write transactions such that write transactions are evenly distributed across the various server clusters in the system.

According to other aspects of the architecture, an application program interface (API) is provided that enables application programs to perform transactions on record objects in the database and other database interactions, such as creating/deleting tables, etc., whereby the application program does not need to know where (i.e., on which server cluster) the record objects are stored or need to implement the native interface language of the database. For example, many RDBMS databases implement variations of the SQL language for manipulation of record objects. The API also includes configuration information that is dynamically updated in accord with changes to the database server layer (e.g., the addition of new computer servers or a new server cluster), which enables application programs to perform read transactions on record objects in the database(s) in a manner that provides load balancing of such transactions.

The architecture provides for incremental scaling of a database server system, whereby read transaction throughput can be increased by adding additional servers to one or more server clusters, and write and read transaction throughput can be increased by adding one or more additional server clusters. Each server cluster stores a percentage of all data being stored (approximately defined by 1/number of server clusters), wherein a duplicate copy of the partition of data is stored on each of the computer servers in the cluster. The partitions of data include both object records and database schema data, including database tables and associated indices and stored procedures. Record objects are distributed across the server clusters based on fragments they are assigned to. Preferably, the record objects are assigned to fragments based on a hashing function. As discussed above, data corresponding to the configuration of the database server layer is maintained such that the system is knowledgeable about where the data is stored, and read and write transaction load balancing is provided.

According to further aspects of the method, the system can be incrementally scaled to improve write and read transaction throughput by adding another server cluster to the system. This comprises adding one or more new servers, creating applicable database resources on the new servers (i.e., database tables, associated indices, stored procedures, etc.), and migrating a portion of the data stored on one or more of the other server clusters to the new server cluster. During data migration, record objects are shipped to the new cluster using either on an individual fragment or a range of fragments basis, such that database transactions can continue to occur while the migration is taking place.

According to yet another aspect of the method, the system can be incrementally scaled to improve read transaction throughput by adding one or more computer servers to a given cluster. As discussed above, the system provides load balancing across each cluster such that read transactions are evenly distributed across all of the computer servers in a given cluster. Since each computer server maintains identical data, adding another computer server to a cluster provides a new resource for facilitating read transactions. Accordingly, this aspect of the method comprises adding a new computer server to a server cluster, creating relevant database objects (tables, stored procedures, etc.) on the new computer server, and copying record objects from one or more other computer servers in the cluster to the new computer server.

As a result of the foregoing schemes, the database server system can be incrementally scaled without having to take the system down, and without having to re-architect the system. Notably, such configuration changes are handled internally by the system such that there are no changes required to application programs that use the system to access data stored in the database server layer.

Other features and advantages of the present invention will be apparent from the accompanying drawings and from the detailed description that follows below.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 7A–C collectively comprise a flowchart illustrating the logic used by the invention when migrating data to a new server cluster;

DETAILED DESCRIPTION OF THE PREFERRED EMBODIMENTS

Definitions

Figure 1A:
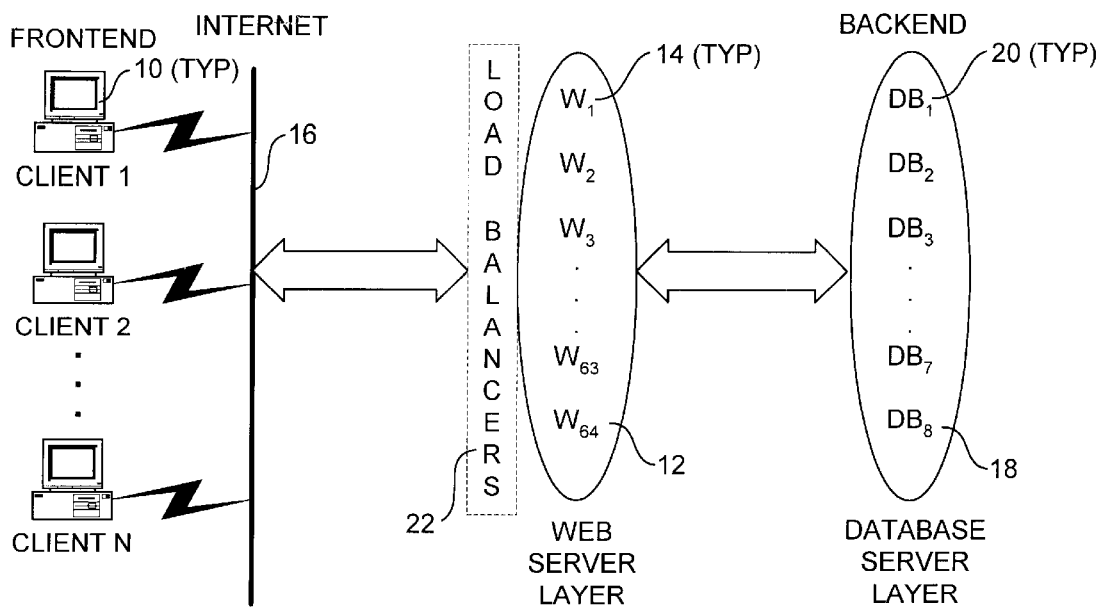
FIG. 1A is a schematic diagram showing the two tiers of a conventional Internet application scheme employing one or more databases.

Initially, several terms used in the following description of the exemplary preferred embodiments of invention and as used in the claims that follow thereafter will be defined. The term "database" is defined as a set of files that store a collection of data. For example, in an Oracle database, these files include data files, control files, index files, stored procedure files, etc. The data in a relational database is stored in tables comprising columns and rows, wherein each row includes multiple fields and the data in a given row is referred to as a record or record object. The database also includes a set of metadata that is used to define the schema (i.e., structure) of the database; including but not limited to the names of the tables and columns, the types and sizes of the columns, and indexing and storage specifications.

The term "database" server comprises an instance of a DBMS: application program, such as Oracle 8i, Microsoft SQL Server, or other database servers provided by such vendors as Sybase, Informix, and IBM, which is used to enable interaction with a database. A database server is typically operated on a computer server, which comprises a computing machine or computer that runs a special operating system that is designed to serve data and files to various clients over a network. Although it is possible to run multiple database servers on a single computer server, there is typically a one-to-one correspondence. Typically, large tables are candidates for partitioning to improve performance. In distributed environments, the data in a database is partitioned (i.e., broken up) so that it resides on more than one machine and/or more than one storage disk. As used herein, partitioned data comprises data that is stored on separate computer servers.

The term "cluster" is defined as a set of one or more computer servers (i.e., machines) that are operated cooperatively. For example, a server cluster comprises one or more computer servers each running an instance of a database server that enables access to all or a portion of the data in a database.

The term "fragment" defines a subset of a partition, comprising a plurality of record objects. As described in further detail below, the present invention enables database tables to be partitioned across multiple computer servers based on the fragments assigned to the various record objects in the table.

The files of a database are stored on a "storage device." A storage device may comprise a single physical unit for storing data, such as a hard disk, or may comprise a plurality of physical units for storing data. Storage devices also include solid state disks, optical disks, and arrays of devices, such as RAIDS.

The term "specialization" is defined as focusing on providing the absolute minimal amount of functionality and optimizing on that functionality. One example of specialization is Internet file servers (or "filers"). Filers are high performance file servers that run a micro kernel operating system and utilize standard hardware components. A filer does not need all of the complex functionality found in a standard operating system, such as the user-interface, printing, device support, and so on, as filers are designed to provide specific functionality. By creating a server that focuses on one or only a few tasks, filers are able to optimize those tasks much better than a general solution. For example, by implementing a simple micro kernel operating system, the filer is able to perform its function without being burdened by the overhead of a standard complex operating system.

The term "I-data" refers to Internet data. Most of the data that is stored and manipulated by Internet applications does not fit a conventional relational or object-oriented data model well. In general, Internet application data is much simpler and more dynamic than the data designed to fit the relational and object oriented data models. Typically, I-data is also simple and flat. Data design is minimal and is expressed easily through extensible markup language (XML).

In addition, schema for I-data may require on-the-fly changes. For example, this may happen when an Internet application is updated to provide a new feature and fields are added to one or more tables of data to enable the new functionality. This is referred to as "run-time schema definition". In contrast, "compile-time schema definition" is generally employed in relational and object-oriented data models. Furthermore, data design for relational and object oriented data is much more complex. In the case of relational data, a formal database design process that includes high-level design tasks such as entity relationship modeling is usually required to ensure proper design of the application.

Common types of I-data include the following: Personalization and profile stores; User sessions; E-commerce wallet information; Email/calendaring/messaging; Image catalogs; File libraries; Personal web pages; Shopping carts; Web community elements such as Message Boards; File storage for collaboration/sharing, etc.

The term "scalability" refers to an ability of a system to expand without unnecessary modification. The scalability of a particular Internet architecture determines whether or not the system can continue to grow and handle increasing amounts of load and data. One major problem with designing and implementing Internet-scale data storage architectures is that it is difficult to determine future needs. Thus, it is important to have an Internet-scale data storage architecture that is scalable or has scalability.

The term "base" means a machine that stores data.

The present invention comprises a netstore architecture for I-data that exhibits high scalability. As will be described in greater detail below, the present invention provides a netstore that has several key features. The first is adaptive partitioning, which refers to the capability to automatically determine the best location to host data based on the real-time state of the netstore, using parameters such as number of clusters, system load and data distribution. The netstore adapts to the current state and updates its partitioning algorithm accordingly. This is in contrast to static partitioning, wherein the partitioning algorithm must be defined by the user during development, and cannot be changed after the system is deployed. Static partitioning is not pragmatic, since there usually is not enough information known at design time to select an efficient static partitioning scheme.

A second advantage is the present invention's use of commodity clustering. Commodity clustering refers to the principle that customers should be able to use whatever resources they have, whether they be high-end multiprocessor machines or lower end models. Customers should be able to simply add new machines to a system so that the cluster assimilates the new resources in the most efficient manner possible.

As an Internet-scale application achieves greater loads and user bases, either more powerful server computers or more numerous server computers will be required. Increasing the power of the server computers has several limitations: more powerful computers are less cost effective; there is a period when service is unavailable while upgrading; and the most powerful computers are ultimately insufficient for reasonable-sized netstores. On the other hand, increasing the number of server computers can lead to an overwhelming complexity in the day-to-day management of the system. The present invention is designed with integrated management features to make the management process as simple as possible, and in many cases, allow for automatic day-to-day management of the system.

Perhaps the most important characteristic of the present invention is that the netstore is scalable. The architecture of the present invention allows an operator to easily increase the number of database servers in the system as the number of users increases, without requiring redesign of the system architecture.

As depicted in FIG. 1A, most of today's Internet applications that utilize databases employ either 2-tier or 3-tier architectures. These architectures enable users 10, through use of various Internet browser clients, such as Netscape Navigator and Microsoft Internet Explorer, to interact with various Internet applications, whereby user information can be stored on and/or extracted from database servers. Accordingly the architecture of FIG. 1A includes a first tier comprising a web server layer 12, which includes a set of front-line web servers 14 that interact directly with users 10 of the Internet application over Internet 16 through use of the HTTP protocol and the Internet browsers. The second tier, comprising a database server layer 18, includes one or more databases 20, which are queried and modified by the user through their web servers 14. Depending on the particular configuration and performance requirements, one or more load balancers 22 may be disposed between web servers 12 and Internet 16. Load balancers 22 are used to distribute the load (i.e., access requests) across web servers 12.

Figure 1B:
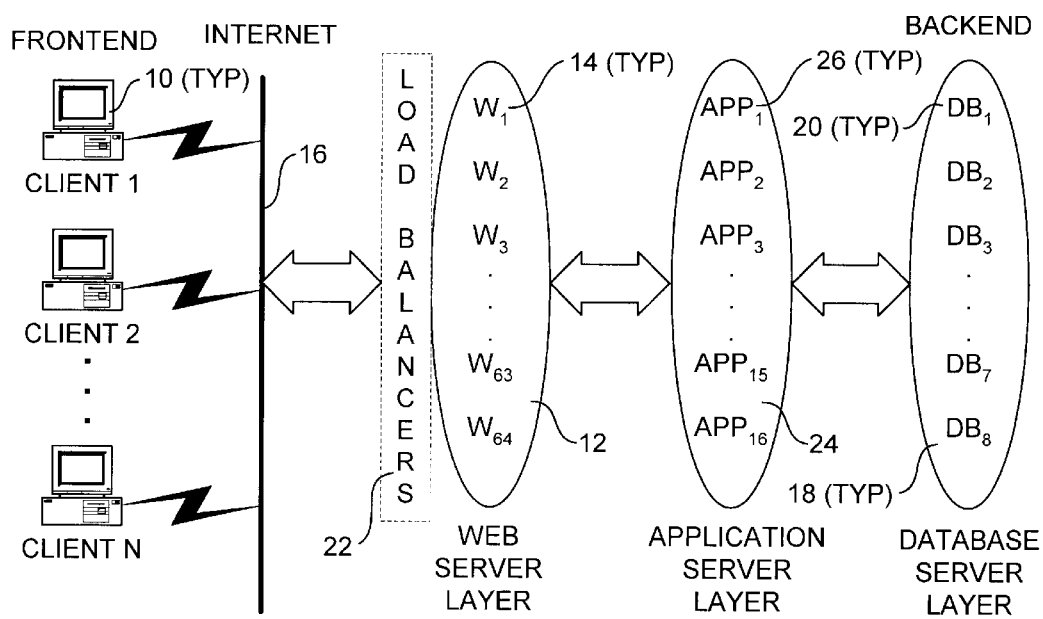
FIG. 1B is a schematic diagram in accord with the FIG. 1A scheme, wherein a third application server tier is implemented.

As shown in FIG. 1B, it is common to add a third tier to the architecture, which comprises an application server layer 24 that includes a plurality of application servers 26. Application servers 26 may co-exist with web servers 14 or comprise a separate bank of servers that are disposed between web servers 14 and database servers 20.

In addition to the configurations shown in FIGS. 1A and 1B, many other architectures exist. Although some differences exist between each of these architectures, a basic principle is followed: front-end clients interact with a set of web servers that access a backend of database servers.

Figure 2:
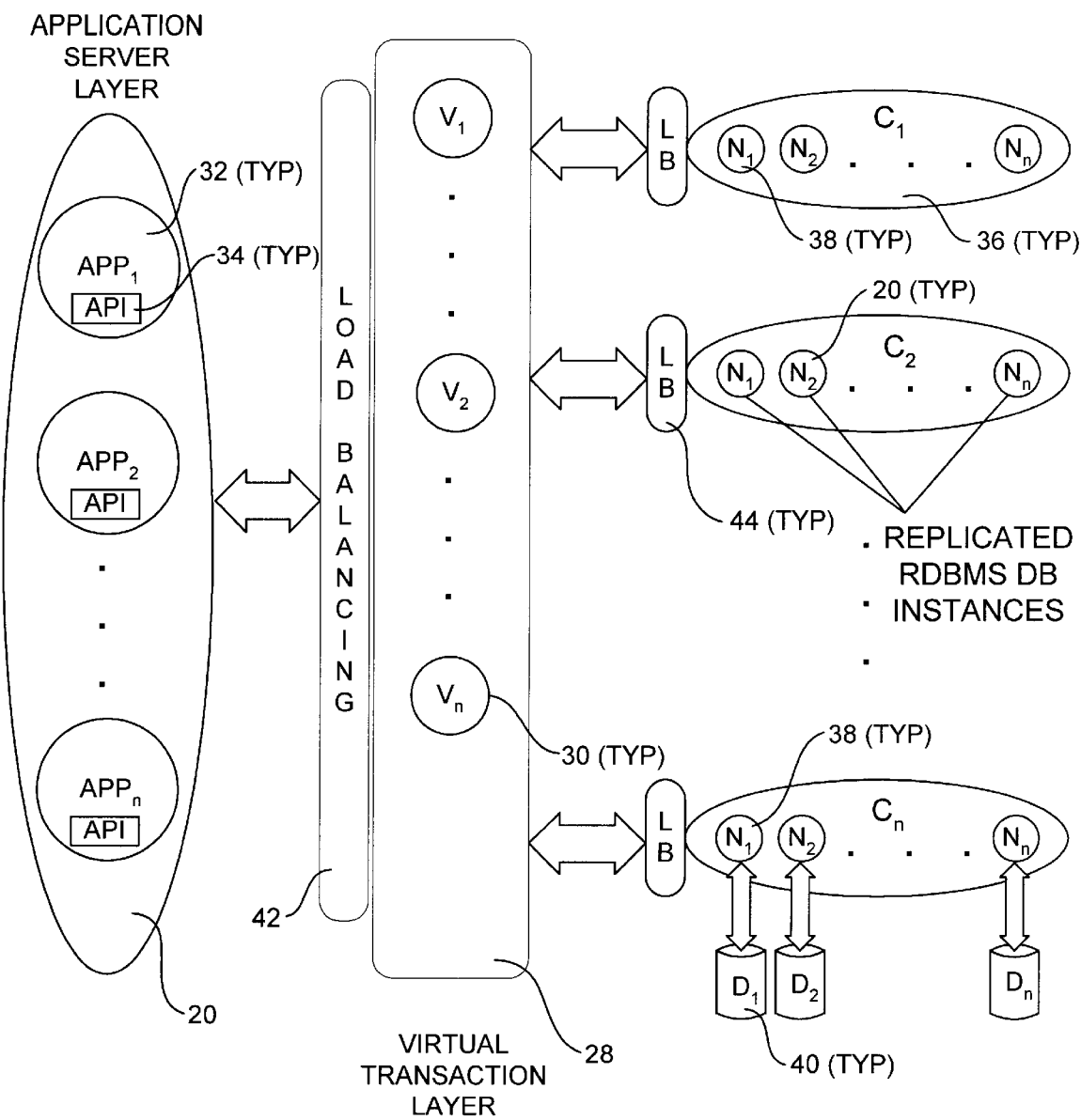
FIG. 2 is a schematic diagram illustrating the architecture of the present invention.

With reference to FIG. 2, the present invention employs a fourth tier, referred to herein as virtual transaction layer 28, disposed between application server layer 20 and database servers 16, which includes a plurality of virtual transaction nodes 30 (labeled $V_1$–$V_n$) through which Internet applications are enabled to interact with databases 20. Importantly, the data store transaction layer enables the databases to be scaled without requiring code or hardware modification at application server layer 20. Although depicted as a separate layer in the Figure, it will be understood that virtual transaction layer 28 also includes components that reside in both application server layer 18 and on machines on which partitions of databases 20 are stored.

Application server layer 18 now further includes a plurality of applications 32 that run on one or more application servers 26 (or on web servers 14 if the application servers are integrated with the web servers), wherein each application is enabled to interact with data store transaction 28 through an API (application program interface) 34. As depicted in the Figure, each of databases 20 are stored in a respective cluster 36, wherein an instance of a partition of the database corresponding to each cluster is replicated on each of a plurality of nodes 38 comprising that cluster. In addition, clusters 36 are configured as shared nothing clusters, wherein each node 38 is connected to a respective storage device 40 upon which a copy of the partition of the database corresponding to the cluster is stored. In addition, as explained below in more detail, database writes (i.e., inserts and updates) are load-balanced, as depicted by a load balancing function 42, such that each of the virtual transaction nodes 30 handles approximately the same work load. Furthermore, any of the instances of a database partition in a given cluster may be accessed during read and/or query operations, wherein such operations preferably are balanced across the plurality of nodes for each cluster, as indicated by load balancing functions 44, further details of which are discussed below.

Figure 3:
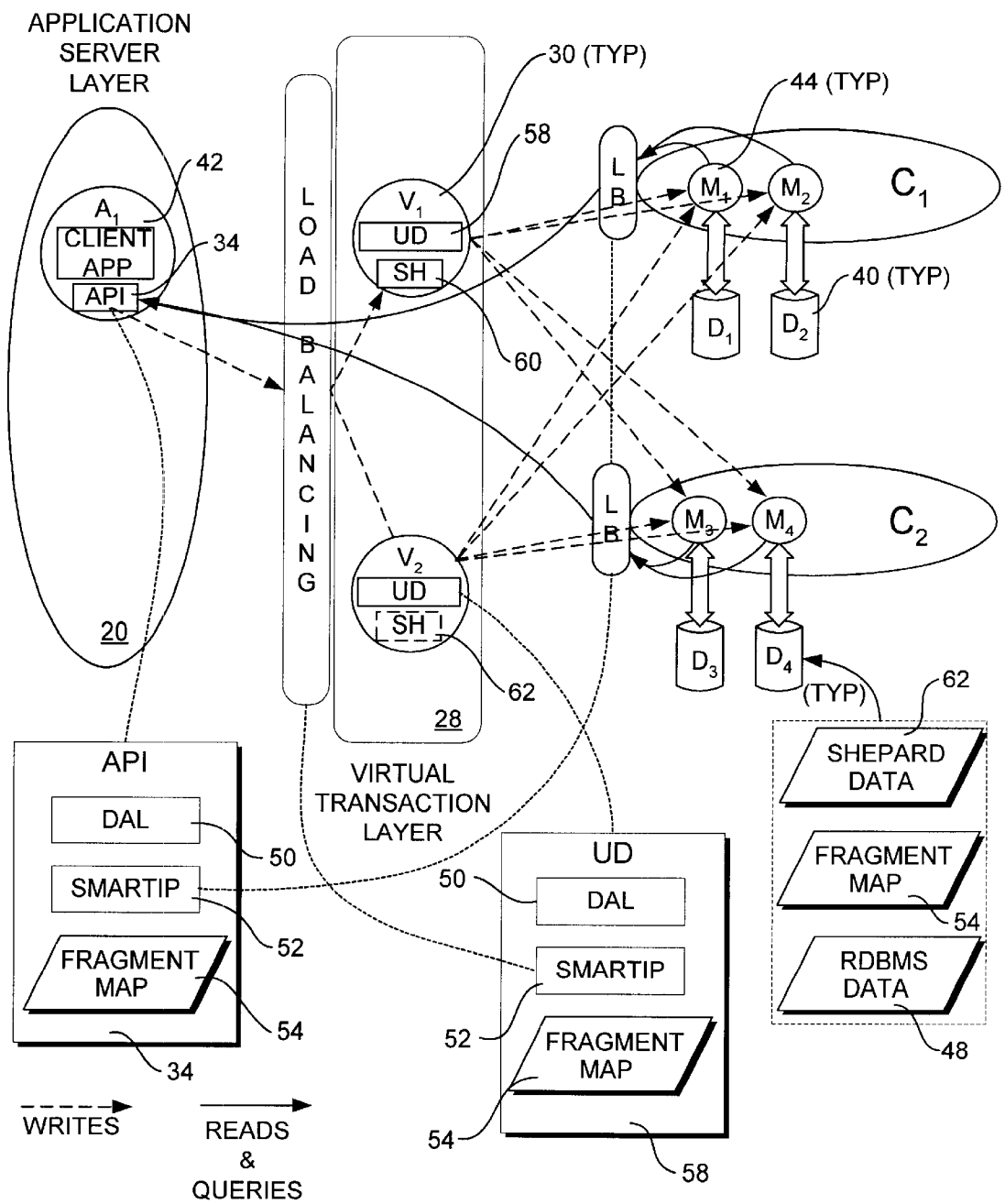
FIG. 3 is a schematic diagram illustrating various system components that are implemented by the present invention to provide an incrementally-scalable database system.

An exemplary system configuration including a client application 42 that accesses database data stored across two clusters $C_1$ and $C_2$ through implementation of virtual store transaction layer 28 is shown in FIG. 3. Each of clusters $C_1$ and $C_2$ include a pair of base machines (bases) 44, respectively labeled $M_1$, $M_2$, $M_3$ and $M_4$, which provide database server functions, and are connected to respective storage devices 46 (labeled $D_1$, $D_2$, $D_3$ and $D_4$) in a shared nothing configuration. As discussed above, partitions of the database are replicated across each node (i.e. base 44) on a cluster-by-cluster basis, as indicated by RDBMS data 48.

Client Application 42 is enabled to interact with the rest of the system through an instance of API 34 that runs on a machine a client application is executing on. API 34 comprises a set of functional components and data, including a database access layer (DAL) 50, an internal communication layer 52 (hereinafter known as SmartIP 52), and a fragment map 54. API 34, in conjunction with other system components described below, enables applications to read, write, update, delete and query data distributed across the various clusters through use of an abstracted set of API calls that perform corresponding database functions, wherein the API calls are abstracted from the underlying calls implemented in the particular RDBMS database(s) that is/are used. For instance, data stored on Oracle database servers are accessed through use of a variant (called PL/SQL) of the well-known SQL (Structured Query Language) language, while many other RDBMS databases implement standard SQL calls (e.g., SQL 92, ANSI, PL/SQL) to access data. Because the SQL variant languages have been designed to support the relational data model, they introduce unnecessary programming complexity when working with the simple I-Data. Rather than require developers to write code directed at a specific database language, a simple set of API calls, designed expressly for dealing with I-Data, is provided through API 34 that enable access to data stored on a variety of different RDBMS databases.

The following TABLE 1 includes a list of API calls provided by API 34 and corresponding functions.

TABLE 1

| APIs | |
|---|---|
| SCHEMA APIs | |
| Schemas are structures used to store data. Schemas are defined by an XML Document Type Definition (DTD), which specifies the format of the data to be stored. The invention's Schema concept allows such things as a named Schema per user to be created and altered on the fly. | |
| LevCreateSchema | Creates a Schema based upon the passed data format (DTD); this creates an allocation of space in the database to allow for creation of objects which conform to the data format of the Schema |
| LevUpdateSchema | Versions the data format of an existing named Schema based upon the new data format, passed as a DTD |
| LevDeleteSchema | Deletes a named Schema and its associated objects |
| LevRetrieveSchema | Retrieve Schema definition for an existing Schema |
| OBJECT APIs | |
| Schemas contain Objects, which correlate to rows (i.e. records) in an RDBMS database | |
| LevCreateObject | Create record in specified Schema based on XML stream |
| LevDeleteObject | Delete record in specified Schema based on value of primary key |
| LevUpdateObject | Updates record in specified Schema based on XML stream |
| LevRetrieveObject | Retrieve record in specified Schema based on value of primary key |
| BINARY APIs | |
| Provides support for Binary file (or blob) storage and stores and synchronizes properties of those files | |
| LevCreateBinary | Creates binary object based on binary file and length |

TABLE 1-continued

| APIs | |
|---|---|
| LevUpdateBinary | Updates binary object based on Binary object ID (returned from LevCreateBinary) and new binary file |
| LevDeleteBinary | Deletes Binary object based on Binary object ID (returned from LevCreateBinary) |
| LevRetrieveBinary | Retrieves Binary file based on Binary object ID (returned form LevCreateBinary) |
| QUERY APIs | |
| The system builds both primary (unique) and secondary (non-unique) indexes on individual fields as specified by the customer during schema creation and modification. This enables queries results with either single or multiple hits (e.g., "get me the object with UserID = JimSmith" or "get me all objects where zip code field = 98019") | |
| Operations | =(EQUALS):0; != (NOT EQUAL): 1; > (GREATER THAN):2; < (LESS THAN):3; >= (GREATER THAN OR EQUAL):4; <= (LESS THAN OR EQUAL):5; LIKE:6 |
| Sort Order | 0:None; 1:Ascending; 2:Descending |
| Schemas | |
| LevQuerySchema | Create Query definition to search for Schemas based on input parameters |
| LevQueryNextSchema | Identifies next Schema that meets Query defined by LevQuerySchema |
| Objects | |
| LevQueryOpen | Create Query definition to search specified Schema based on Key value and operation code |
| LevQueryNextObject | Locate next object in results list based on Query defined by LevQueryOpen |
| LevQueryNumObjects | Outputs number of objects meeting Query defined by LevQueryOpen |
| LevQueryClose | Closes query opened by LevQueryOpen |

Client Application 42 is enabled to read and query data directly from bases 44, wherein SmartIP 52 provides a load balancing function such that read and query operations are distributed across the bases in each cluster. For example, suppose that a transaction is requested to access a data record that is stored on bases $M_1$ and $M_2$ in cluster $C_1$. SmartIP 52 allocates the transaction loading on each of the bases in a given cluster such that the loads on that cluster are balanced. For instance, this can by done by randomly allocating the workload across the bases in each cluster. As a result, the data record may be retrieved from either base $M_1$ or $M_2$.

As described below in further detail, fragment map 54 is used to determine which cluster data is retrieved from or written to. When a request is made through API 34 to retrieve data (i.e., a read or query operation), the cluster or clusters the data is stored on is determined by examining fragment map 54. Accordingly, data may be retrieved from any of bases $M_1$–$M_4$, depending on which cluster the data is stored on, and load balancing considerations.

Create, update, and delete transactions require another level of abstraction, which is provided by system components running on one or more virtual transaction nodes 30, labeled $V_1$ through $V_n$, disposed on virtual transaction layer 28. Each of the virtual transaction nodes in a system comprises a machine on which multiple system components are executing, including an Update/Distributor component (UD) 58. Each UD 58 includes an instance of DAL 50, SmartIP 52, and fragment map 54.

UD 58 provides functionality such that a given create/update/delete request is performed on all of the bases in a particular cluster in substantial synchrony, wherein the cluster is selected through use of fragment map 54. For instance, if a create/update/delete request affects data stored in cluster $C_2$, the request will be performed at substantially the same time on both bases $M_3$ and $M_4$. UD 58 provides a strong consistency guarantee: either all bases will record the change or all will not. If the change is successfully updated by all bases, then readers of that data will see the new version of the data at the same time across all bases, as though there were only one copy of the data.

As with the foregoing read/query transactions, SmartIP 52 provides load balancing across all the virtual transaction nodes in a system. As before, this function can be performed through random distribution of create/update/delete transactions requests across all of the virtual transaction nodes in the system (i.e., nodes $V_1$ and $V_2$).

A key component in the system is known as the "shepherd," depicted as "SH" 60 in FIG. 3. An active instance of the shepherd 60 is running on one of the virtual transaction nodes in the system (in this case node $V_1$). If the node the shepherd is running on fails, a new instance of the shepherd 62 is launched on one of the other virtual transaction nodes in the system. The shepherd maintains the official versions of the system configuration, consisting of precisely the clusters, the assignments of bases to the clusters, the state of all the bases, and the fragment map. The shepherd 60 manages all change to the system configuration, and stores this data 64 on each of storage devices 46.

Adaptive Partitioning

A key aspect to the present invention is the ability to adjust partitioning of a database(s) on the fly, without having to shut down the servers and re-architect the database(s). In typical large-scale databases, tables are partitioned according to a predefined (i.e., fixed) scheme. Partitioning databases in this manner generally yields improved performance, but does not solve the problem associated with large increases in the volume of data transactions typical of growing enterprises. The ultimate benefit provided by adaptive partitioning is that transaction throughput can be increased by merely adding more resources (i.e., servers and support software) without having to re-engineer the system.

Adaptive partitioning is based on breaking the database tables into fragmented subsets, and mapping individual data objects to such fragments based on hashing techniques. In general, hashing divides data objects (i.e., table records) among a number of units of storage, commonly referred to as buckets, based on a hashing function that is typically based on a search-key value of each record.

Figure 4:
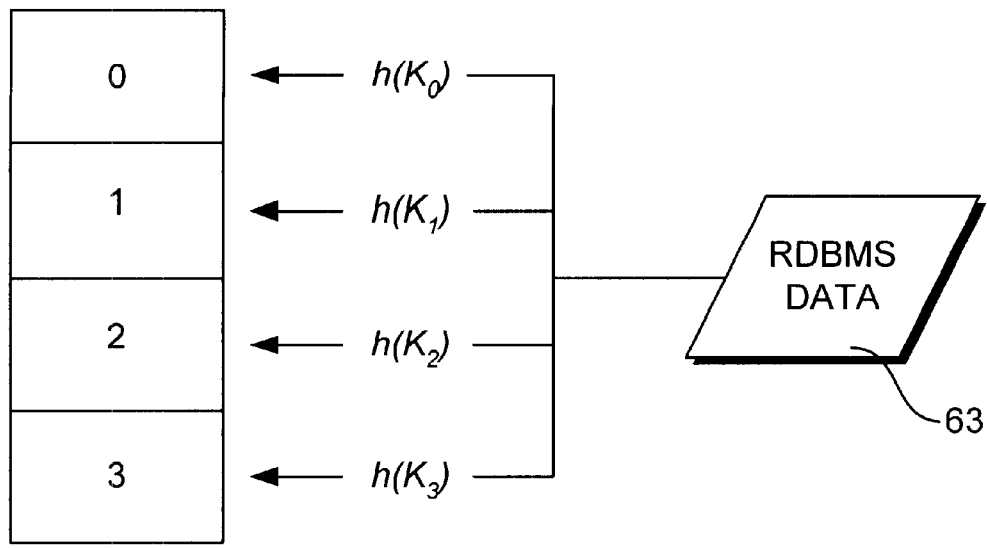
FIG. 4 is a block diagram illustrating distribution of RDBMS data using a hashing function.

With reference to FIG. 4, suppose there is an exemplary hashing scheme that distributes data objects in an RDBMS database 63 among four buckets labeled 0–3 using a hashing function, $h(K_i)$, wherein $K_i$ represents a search key corresponding to a respective hash bucket. Ideally, the data objects should be distributed among the buckets such that the distribution is uniform. One hash function that typically distributes data objects fairly evenly comprises summing the binary representation of characters in each object's corresponding search key, and distributing the data objects to corresponding hash buckets based on the modulus (in accord with the number of buckets) of the sum.

Figure 5:
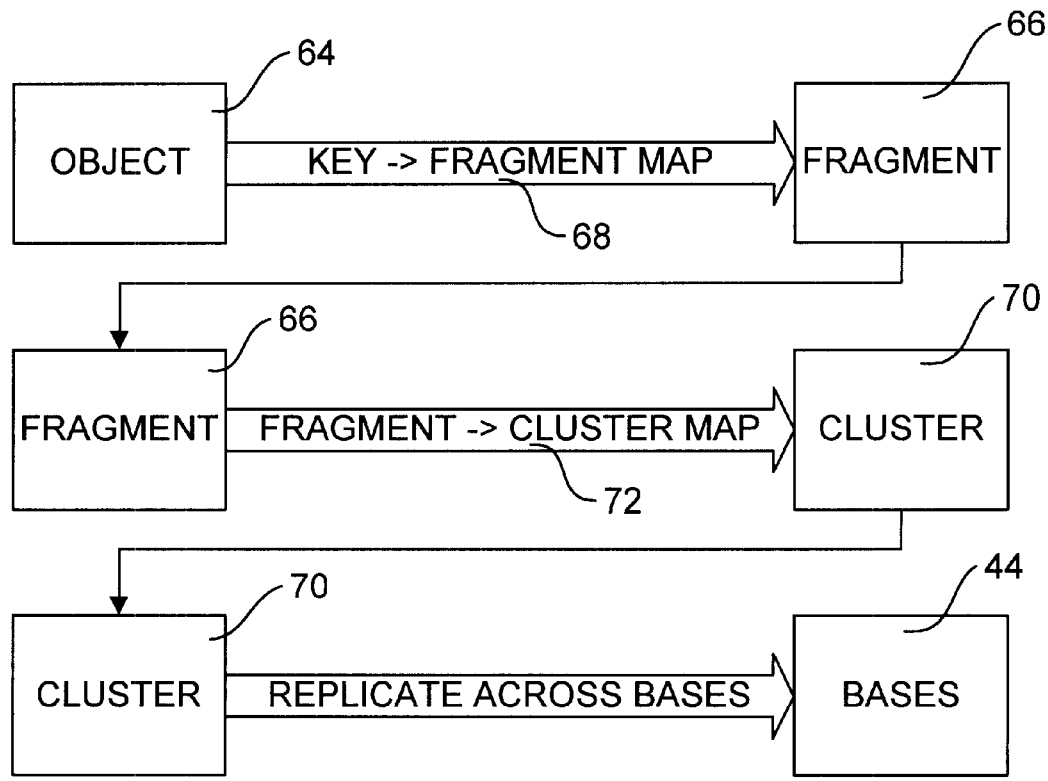
FIG. 5 is a block diagram illustrating how record objects are partitioned across the database server system of the present invention using a fragmenting scheme.

With reference to FIG. 5, individual data objects 64 are mapped to individual fragments 66 based on a Key→Fragment Map 68 using a fixed hashing function that can determine the fragment a key is in locally. Preferably, the fixed hash comprises a, sum modulo operation that depends on: 1) Group name; 2) Table name; and 3) Primary key value. There are several implications of having a fixed Key→Fragment Map. One is that the set of fragments is finite and fixed. Clusters and fragments are decoupled, so that clusters can be added or removed without changing the number of fragments. Moreover, there need to be a lot of fragments so that the load is not unbalanced.

Next, each Fragment 66 is mapped to a corresponding Cluster 70 through use of a Fragment→Cluster Map 72, which comprises an array (FragmentMap) indexed by FragmentID. FragmentMap is replicated in the memory of each virtual transaction node 30. It is preferable that the number of fragments be large enough to ensure future scaling of the system, but be small enough to permit the fragment map to be of reasonable size. For instance, 2^14 (16 K) fragments, the number of fragments used in a currently preferred embodiment, yields a 32 Kbyte table when 2 bytes are allocated for each entry in the table. Finally, instances of the data objects are replicated across all bases 44.

Since an entire fragment resides on a single cluster, fragments are the smallest unit of data migration. Having a large number of small fragments has two advantages and one disadvantage. The small size of fragments allows the use of locking during migration, which is simpler than logging transactions and catching up. Any data that are unavailable during migration are only in motion for a short time. Since a fragment is relatively small when compared with the overall total storage of the system, the use of fragment migration can achieve a fine-grained, well-balanced load, despite a fixed hash from objects to fragments.

As described in further detail below, every participant in virtual transaction layer 28 maintains a fragment map. A fragment map must always be valid, i.e., it must map every fragment to an actual cluster. However, a fragment map does not need to be up-to-date. An up-to-date fragment map would know where every fragment was at every time. This would require changing all the maps in a migration transaction (see below), which would unnecessarily serialize the distribution system. Instead, participants use out-of-date maps to track down a fragment along a forwarding chain, as follows. If a given map requests to ask cluster N for data from fragment F, and cluster N does not have the data, cluster N will identify which cluster has fragment F. It will update the map, and ask again, etc. The chain invariant is the requirement that this process ends at the cluster where F resides. The following consistency rules enforce the chain invariant.

1. A client just needs to have a valid fragment map.
2. Let FM be the fragment map of a base M in cluster $C_1$.
   i. FM is valid.
   ii. For exactly the fragments F residing on $C_1$, FM(F)=$C_1$. In other words, every cluster knows what it does and does not own.
   iii. For each fragment F that does not reside on $C_1$, FM(F)=some other cluster $C_2$ that F resided on at some point. Moreover, F resided on $C_2$ more recently than $C_1$.

The forwarding chain starting a map FM for fragment F is the sequence of bases starting with FM(F), such that each base in the chain thinks F resided on the next, and F resides on the last one.

A base M in a cluster C can maintain the consistency requirement if it:
1. Starts off correct (the starting configuration is fixed), and
2. Records every migration in which C is the source or destination.

Figure 6:
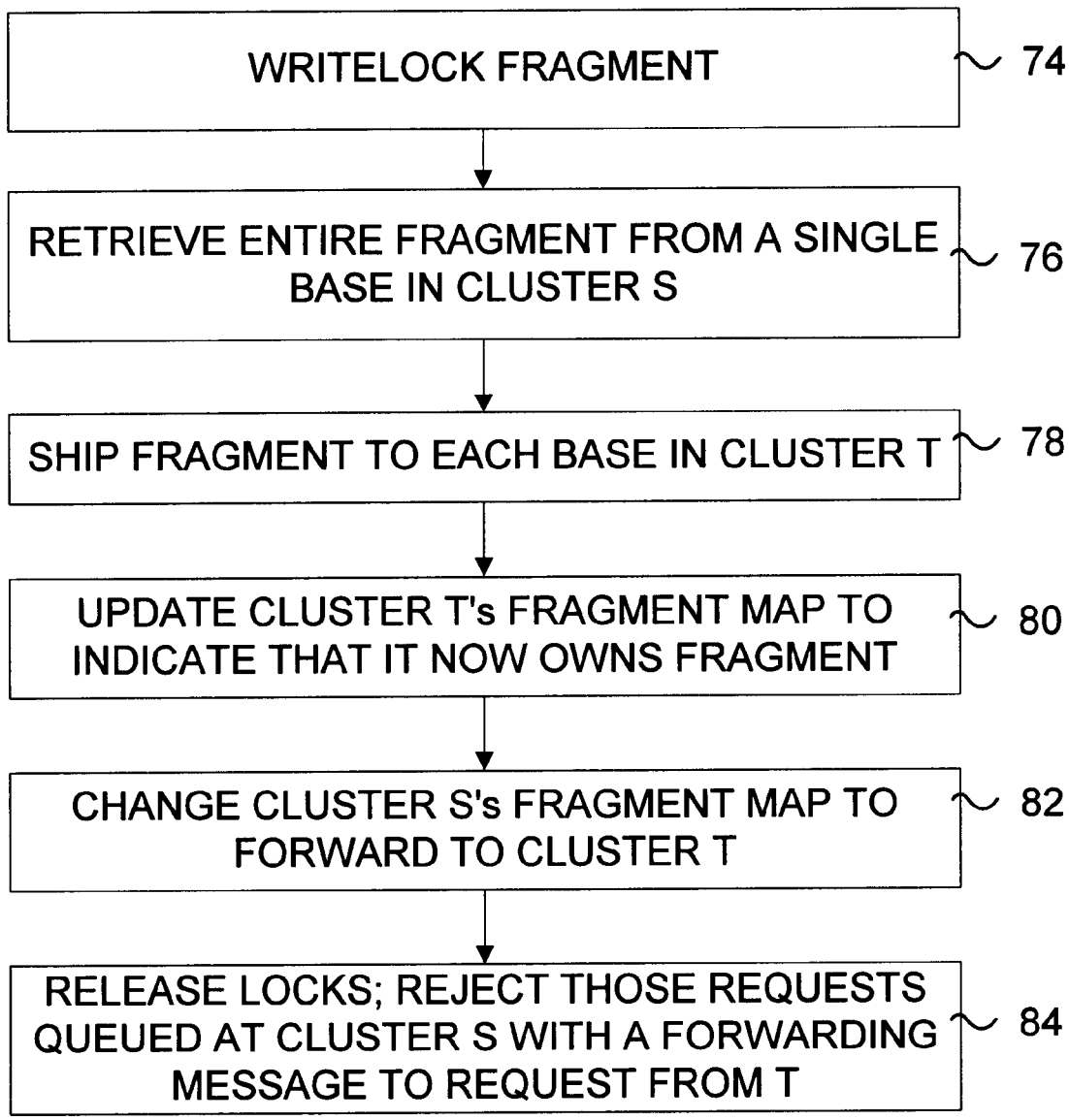
FIG. 6 is a flowchart illustrating the logic used by the invention when migrating a data fragment to a new server cluster.

It will sometimes be desired to move fragments between clusters. The flowchart of FIG. 6 provides an overview of the steps that are performed when moving a fragment from a heavily used cluster S to a lightly used cluster T. Further details of this process are presented below with reference to the discussion of data migration. The process of moving a fragment from cluster S to cluster T begins in a block 74, wherein the fragment is WriteLocked, thereby preventing any data in the fragment from being modified. Next, the entire fragment is retrieved from a single base in cluster S, whereupon a copy of the fragment is shipped to each base in cluster T, as respectively provided by blocks 76 and 78. The logic then flows to a block 80, wherein cluster T's fragment map is updated to indicate that it now owns the fragment. In addition, cluster S's fragment map needs to be updated to forward requests corresponding to the fragment to cluster T, as provided by a block 82. Upon completion of these steps, locks on the fragment are released, and any requests of data transactions corresponding to the fragment that were made to Cluster S during the move are rejected with a message forwarding the request to Cluster T.

Clients can always just proceed as though their fragment maps are correct. However, after a migration occurs, a number of client requests may go to the wrong base. In particular, any retrieve/update/create/delete of schemas/objects located on the migrated fragment may cause this to occur. When this happens, the base contacted will send a response indicating that the fragment is elsewhere, and where the fragment is. The client immediately updates its map, and retries the message to the right base. If the request is sent during a transaction, and it receives a response that the fragment has been moved, the transaction should be aborted.

When a fragment is being copied or moved, user requests to create/update/delete data in such fragments fail by virtue of the data being busy (i.e., the application is informed that the data isn't presently available). As a result, whenever a fragment is in motion, the data in it can be retrieved from the old location, but not created, updated, or deleted. Since reads and queries come from the API directly to the base, they are simply permitted—the API is not aware that the fragment is being copied or moved. However, all writes proceed from the API through some UD to the base. To prevent writes on moving fragments, each UD has one fragment lock per cluster.

During data transfers, the shepherd sends each UD a message to lock the fragment lock exclusively. It sends four numbers: a range [low, high] of fragments (inclusive) in motion, the source cluster, and the destination cluster. The effect of the lock is to prevent modifications to exactly the fragments in the range that happen to reside on the source. This lock message is idempotent, and only one data shipping process may be in progress at any give time. This message blocks, until it can get the lock exclusively.

User requests to write some object to the database need a shared lock to the fragment. If the fragment is in the range and on the source cluster, then it will fail to get the lock while the data is in motion. Since there is no waiting for user requests, it returns right away with a data busy message.

The highest level subroutines that control data shipping use a special form of two-phase commit, since it must be possible to get back to a consistent, uncorrupted state from any failure. The shepherd handles these transactions. It does not use a transaction manager; however, in a sense, each routine is a special-purpose transaction manager. Only one data shipping operation can occur at a time. Moreover, a UD cannot be brought into the system during a data shipping event. Some operation on the persisted configuration state indicates that a bootstrap or migration has begun (i.e., the prepare phase). Bootstrapping occurs when a base is added to an existing cluster that has one or more bases already in it.

Some other operation serves as a commit decision. If the shepherd doesn't die, it will either run the shipping to completion, or fail and abort the completion. If the shepherd does die, a new shepherd will read the persisted state to determine whether any shipping operation was in progress. It will then abort (if in the prepare phase) or complete (if in the commit phase). Anytime after the process is completed or aborted, the persisted state is updated to indicate that no shipping operation is in progress.

The scheme exploits the special property that the abort and complete procedures must be idempotent and restartable, wherein the commit is atomic. The following pseudocode outlines the procedure:

hr=Prepare( );
if (FAILED(hr)) goto doAbort;
hr=Commit( );
if (FAILED(hr)) goto doAbort;
do { hr=Complete( ); } while (Failed(hr));
return S_OK;
doAbort:
do { hr=Abort( ); } while (FAILED(hr));
return S_ABORTED;

Migration

Suppose that it is desired to add new resources to the system in order to increase transaction volume. Generally, adding one or more bases to a cluster will increase read/query throughput, but will not improve (and may possibly degrade) create/update/delete operations. The best way to improve both read/query and create/update/delete transaction performance is to add one or more additional clusters. As noted above, this can be done without requiring the system to be shut down, a significant improvement over the prior art.

Figure 7A:
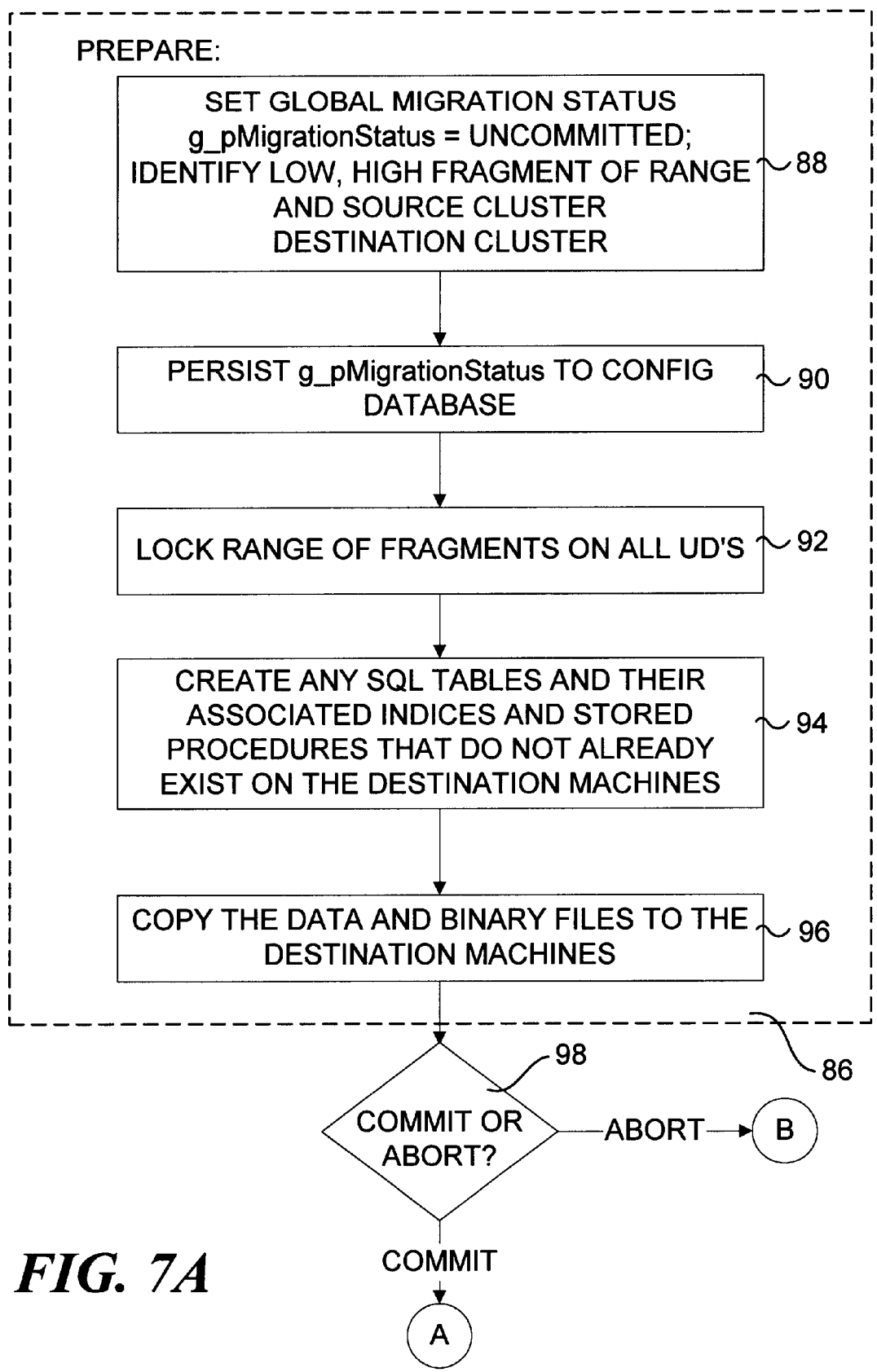

In order to take advantage of the new cluster(s), it is necessary to move fragments of the data presently stored on existing clusters. This process is known as data migration. With reference to FIG. 7A, the process of data migration begins with a preparation phase 82 that starts with a block 88 in which a global migration status g_pMigrationStatus is set to uncommitted, indicating the current process phase is the preparation phase; and the low and high fragment range and the source and destination clusters are identified. Next, the g_pMigrationStatus is persisted to the configuration database (i.e., the shepherd data), as provided by a block 90. The range of fragments are then locked on all UD's in accord with a block 92. In a block 94, any SQL tables and associated indices and stored procedures that do not already exist on the destination machines are created. The prepare phase is completed in a block 96, wherein the data and binary files are copied to each of the bases in the destination cluster.

At this point, a determination is made in a decision block 98 to whether to commit the data or abort the migration. If the decision is to commit the data, the logic flows to a block 100 in the flowchart portion shown in FIG. 7B, which changes the migration status to committed. Next, the fragment maps in each base of the source and destination clusters are changed to reflect movement of the data, as provided by a block 102. In a block 104, the fragment maps on all UD's are also updated to reflect the new fragment configuration. The local fragment maps on each of the bases are also changed to reflect the migration, as provided by a block 106. This information is persisted in the configuration database.

The logic next flows to a block 108, in which all of the fragments with the ranges fragments are unlocked. Any data and binaries on the source machines that have been moved to the destination machines and any temporary files on the shepherd are deleted, in accord with respective blocks 110 and 112. The process is identified to the system as completed by setting g_pMigration Status=done/none, as provided by a block 114.

If a determination is made in decision block 98 to abort the process, the logic flows to a block 116 of the flowchart portion shown in FIG. 7C, wherein all of the fragments within the fragment range are unlocked. Next, in a block 118, all of the data and binaries that were just copied to the destination cluster machines are deleted, along with any temporary files created for the migration on the shepherd, as provided by a block 120. The process is identified as being completed by setting g_pMigration Status=done/none, in accord with a block 122.

Bootstrapping

There will be some instances in which it is desired to increase read/query throughput without having to add a new cluster. This can be accomplished by adding another node (i.e., another base machine) to a given cluster. A process known as bootstrapping is performed to ensure the database data are properly copied to the new node and that the system configuration data reflects the new configuration of the system.

Figure 8:
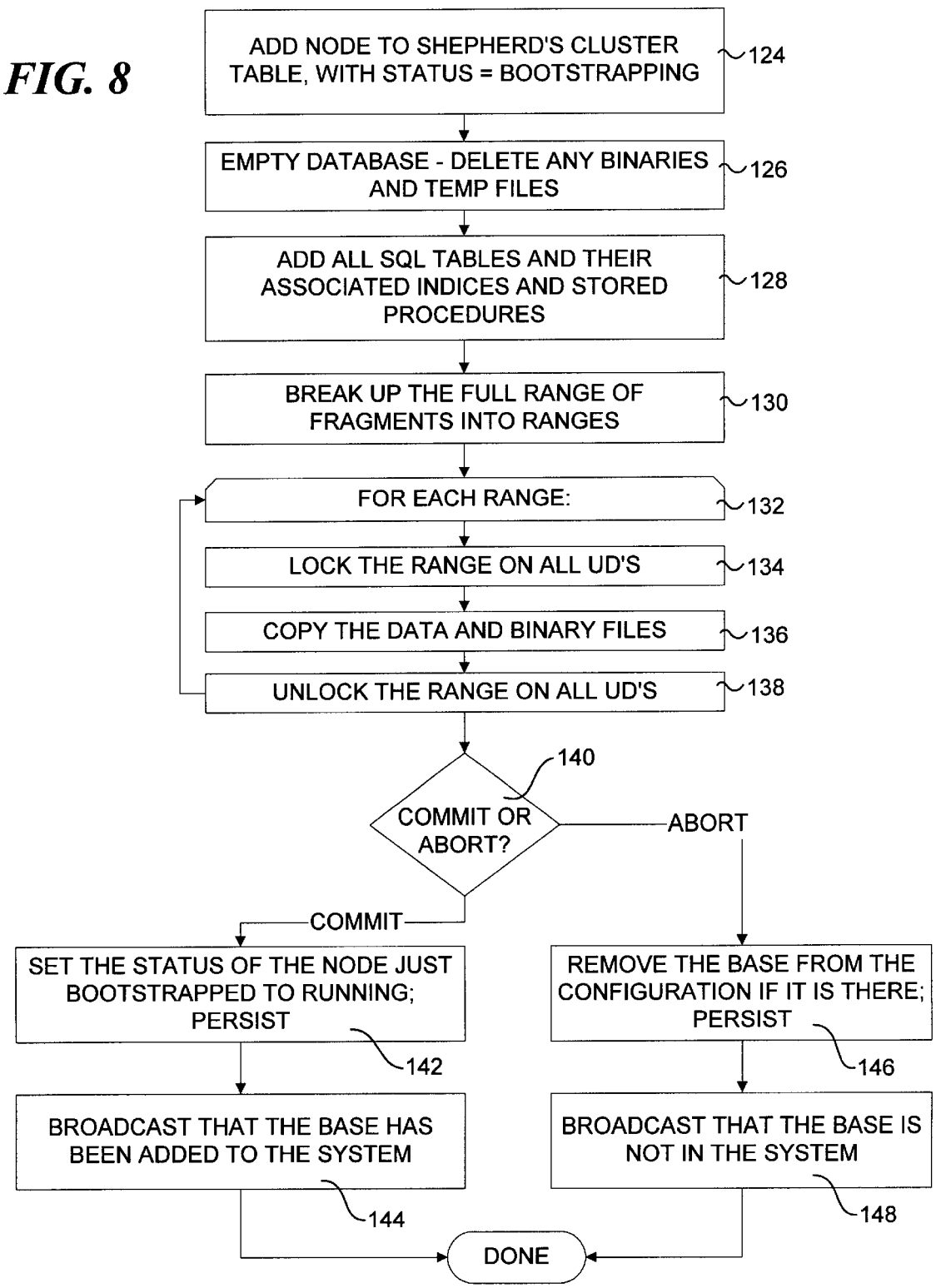
FIG. 8 is a flowchart illustrating the logic used by the invention when "bootstrapping" a new computer server that has been added to a server cluster.

With reference to FIG. 8, the bootstrapping process begins by adding the node to the shepherd's cluster table, and the operation status of the node is set to bootstrapping, as provided by a block 124. Next, in a block 126, the database on the new node is emptied by deleting any binary and temporary files, whereupon all SQL tables and their associated indices and stored procedures are added to the new node in accord with a block 128. It is next necessary to copy the database data into the tables of the new node. This is accomplished by first breaking up the full range of fragments corresponding to the cluster into ranges, as provided by a block 130. Next, for each range ,as provided by a start loop block 132, the range is locked for all UD's, the data and binary files corresponding to the range are copied to the new node, and the range is unlocked on all UD's, in accord with respective blocks 134,136, and 138.

Next, a determination is made in a decision block 140 to whether to commit the data, or abort the process. If the data is to be committed, the operation status of the node is set to running in a block 142, and the shepherd broadcasts to the other components in the system that the new base has been added, as provided by a block 144. If the process is to be aborted, the new base is removed from the system configuration data if it exists in a block 146, and the shepherd broadcasts to the other components in the system that the new base is not part of the present configuration.

DETAILED EXAMPLE

The following is a detailed example of operations performed on an exemplary database during typical activities, including initial configuration of the database and migration. The system configuration corresponds to the configuration shown in FIG. 3, with an initially empty database running on a system instance with the following configuration: two clusters, $C_1$ and $C_2$; four base machines $M_1$, $M_2$ (in cluster $C_1$), $M_3$, and $M_4$ (in cluster $C_2$), two virtual transaction layer machines $V_1$ and $V_2$, each running an update distributor, a single shepherd instance running on $V_1$, and a single client application machine $A_1$ running an instance of API 34.

Consider a database consisting of a single table "customer" with two fields, as shown in TABLE 2:

TABLE 2

| ID (4-byte integer) | Name (variable-length character) |
|---|---|
| 46215 | Joe |
| 91111 | Jane |

In the following discussion, this data will be added to an exemplary system, updated, retrieved, and deleted. The system will also be reconfigured while there is data in it.

The first task is to define what constitutes the state of the system. The state of the system will first be described in its initial configuration, before data is entered. Then, the configuration of the system will be described as each operation is performed and completed.

System Persisted State

At a given point in time, the persisted parts of the system state are as follows.
System Tables Defined in the Bases.
1. META_TABLE—each row contains the name of a system user table, its indices, and stored procedures.
2. OPEN_XACTS—contains a row identifying each transaction that is open from the point of view of this base
3. COMMITTED_XACTS—contains a row identifying each recent transaction involving this base that has committed (completed successfully)
4. BINARY—contains system large binary objects
5. SCHEMAS—contains system schemas User tables defined in system bases. Each object stored in the system is represented by a row in a user table on one cluster. All machines in a cluster store the same data, i.e., the data in a given cluster is replicated across all bases in the cluster.

Rows stored in those tables. Each table will comprise one or more rows of data, in accord with data records entered into the system through various transactions.

Stored procedures and indices defined in system bases. Associated with each system and user table is some ancillary information that is created and destroyed with the table, which helps the RDBMS operate on those tables. This ancillary information includes stored procedures and indices.

Shared cluster map. Each component other than the system bases needs a map indicating the name, function, and state of each base, and the number of clusters. Further details of the cluster map are presented below during discussion of the newcluster and newnode operations.

Shared fragment map. Each component (including the bases) needs a map of the fragments and which clusters they are stored on.

Shared migration state. The shepherd needs to know on startup whether any migration was in progress when a previous shepherd was stopped. This state will be discussed in the newcluster command below.

Initial System State

The shared cluster map has the following initial configuration, as shown in TABLE 3:

TABLE 3

| Cluster | Count | Base | IP Address | State |
|---------|-------|------|------------|-------|
| 1 | 2 | M1 | 255.255.255.119 | Running |
|   |   | M2 | 255.255.255.100 | Running |
| 2 | 2 | M3 | 255.255.255.124 | Running |
|   |   | M4 | 255.255.255.121 | Running |
| Number of clusters: | 2 | | | |
| Number of UDs: | 1 | | | |
|   |   | UD1 | 255.255.255.101 | Running |

The shared fragment map has the following initial configuration, as shown in TABLE 4:

TABLE 4

| Fragment | Cluster |
|----------|---------|
| 0 | 1 |
| 1 | 1 |
| ... | ... |
| MAX_FRAGMENTS/2 − 1 | 1 |
| MAX_FRAGMENTS/2 | 2 |
| MAX_FRAGMENTS/2 + 1 | 2 |
| ... | ... |
| MAX_FRAGMENTS-1 | 2 |

MAX_FRAGMENTS may be any positive number; presently, in a preferred implementation, a value of $2^{14}$ is used.

Contents of the five system tables that will be followed in detail and user tables (data rows in bold; tables not bold):

TABLE 5

| Base(s) | Table | Contents... | | | |
|---------|-------|-------------|---|---|---|
| M1 and M2 | META_TABLE | Table | Create | Indices | Stored Procedures |
|   | OPEN_XACTS | XactID | Time | | |
|   | COMMITTED_ XACTS | | | | |
| M3 and M4 | META_TABLE | Table | Create | Indices | Stored Procedures |
|   | OPEN_XACTS | ID | Table | Primary Key | |
|   | COMMITTED_ XACTS | ID | Table | Primary Key | |

LevCreateSchema

The application constructs a representation of the schema that it wishes to create. There are many representations that may be used; the system currently supports the XML DTD (document type definition) form. A DTD for the customer table would be:

DTD="<?xml version='1.0' encoding='UTF-16'?>
<!ELEMENT CUSTOMER (ID, NAME)>
<!ELEMENT ID (#PCDATA)>
<!ATTLIST ID lev_datatype CDATA #FIXED\"INTEGER\">
<!ATTLIST ID lev_datalength CDATA #FIXED\"4\">
<!ELEMENT NAME (#PCDATA)>
<!ATTLIST NAME lev_datatype CDATA #FIXED\"VARCHAR\">"

When an application creates a schema, it supplies a unique name for that schema, as follows:

LevCreateSchema(UserID, SchemaName, Schema) e.g.,

LevCreateSchema("Ecompany","CustomersSchema", DTD)

This results in the following actions:

1. The API consults SmartIP's UDLoadBalancer( ) method, which uses the cluster map and load information to select a UD box to connect to. The UDLoadBalancer returns a connection to one of the UDs, e.g., $V_1$.
2. The API sends a message to the selected UD containing:
   a. The type of request (which is LevCreateSchema)
   b. SchemaName
   c. Schema
3. The UD, upon receiving the message, creates a new transaction identifier (XID) to open.
4. The UD consults SmartIP's GetFragment("SCHEMAS", SchemaName) method, to determine which fragment the schema will be stored in. It returns a fragment number. Suppose the result is 12.
5. The UD consults SmartIP's GetCluster(Fragment) method to determine, from the fragment map, which cluster stores that fragment. The result will be $C_1$.
6. The UD requests the schema from the system using the LevRetrieveSchema code path (see below) to determine whether the SchemaName is in use. It is not.
7. The UD consults SmartIP's GetDALs(Cluster) method to get a list of database access layer objects representing each base in the cluster. The DALs returned will be $DAL(V_1,M_1)$ and $DAL(V_1,M_2)$.
8. The UD invokes each DAL with the CreateObject(xid, table, primary key, object) method, with four parameters: the transaction id, the table (in this case "SCHEMAS"), the primary key (in this case SchemaName), and the data record, which consists of the SchemaName and Schema, in the system's proprietary format.
9. The DAL object for a given base makes a number of changes to the database state. The function of the DAL CreateObject method is to record the open transaction and the data that has been sent, but is not committed. This data can then be aborted or committed as indicated by a later decision. Meanwhile, no other transaction can begin involving the object in question. This can be accomplished many ways; the result of one way is shown here. The complex locking and retry logic that is required to make this procedure threadsafe is not described herein.
   a. A row is added to the metatable for the SCHEMAS table if it does not exist already.
   b. The SCHEMAS table is created if it does not exist already.
   c. The associated indices and stored procedures for accessing the SCHEMAS table are added to the database.
   d. A row is added to the SCHEMAS table to store the uncommitted data. Uncommitted data has status field set to "U".
   e. A row is added to the OPEN_XACTS table naming the transaction ID, the "SCHEMAS" table, and the primary key.

An Intermediate result of LevCreateSchema is shown in TABLE 6, as follows, wherein the newly added items are indicated in bold:

TABLE 6

| Bases | | Table Contents... | | | |
|---|---|---|---|---|---|
| M1 and M2 | META_TABLE | Table | Create | Indices | Stored Procedures |
| | OPEN_XACTS | SCHEMAS XID (V1,1) | XXXX Table SCHEMAS | XXXX Primary Key CustomersSchema | XXXX |
| | COMMITTED_ XACTS | XID | Table | Primary Key | |
| | BINARY | Fragment | Status | Key_0 | Data |
| | SCHEMAS | Fragment 12 | Status U | Key_0 CustomersSchema | Data XXXX |
| M3 and M4 | META_TABLE | Table | Create | Indices | Stored Procedures |
| | OPEN_XACTS | ID | Table | Primary Key | |
| | COMMITTED_ XACTS | ID | Table | Primary Key | |

10. The UD records the result (success or failure) of the DAL invocations as they complete. If all succeed, it then invokes the Commit(xid) method on each DAL. Otherwise, it invokes the Abort(xid) method. It is assumed the commit method is invoked.

11. The purpose of the DAL Commit method is to replace the uncommitted data with committed data in a way that cannot fail, and to release any data that is locked. This is done by changing the status of the data row to "C" and deleting from the OPEN_XACTS table.

The final result of LevCreateSchema is shown in TABLE 7:

TABLE 7

| Bases | | Table Contents... | | | |
|---|---|---|---|---|---|
| M1 and M2 | META_TABLE | Table | Create | Indices | Stored Procedures |
| | OPEN_XACTS | SCHEMAS XID | XXXX Table | XXXX Primary Key | XXXX |
| | COMMITTED_ XACTS | XID | Table | Primary Key | |
| | BINARY | Fragment | Status | Key_0 | Data |
| | SCHEMAS | Fragment 12 | Status C | Key_0 CustomersSchema | Data XXXX |
| M3 and M4 | META_TABLE | Table | Create | Indices | Stored Procedures |
| | OPEN_XACTS | ID | Table | Primary Key | |
| | COMMITTED_ XACTS | ID | Table | Primary Key | |

LevCreateObject, LevUpdateObject

An object in the system is a structure consisting of fields of predefined type. These types are specified in the schema in which the object will reside. Every object has a primary key that uniquely determines the object. A user specifies the values for each of the fields. This can be done in many ways; an XML representation of that value assignment is presently supported, although other representations could be implemented as well. The user would construct an XML string like:

XML=(XML code)

and call:

LevCreateObject(UserID, SchemaName, Object)

LevUpdateObject(UserID, SchemaName, Object) e.g.,

LevCreateObject("Ecompany", "Customers", XML)

This produces a result that is very similar to the LevCreateSchema call. First, RetrieveSchema is called to retrieve the data structure definition of the "Customers" schema. Then the XML is validated against the schema. Assuming that the XML conforms to the schema, the XML object is converted to the system's internal format for transmission to the UD. The UD uses a method GetPrimaryKey (InternalObject) to extract the primary key PK. GetFragment ("customers", 46215) returns some fragment, say 50. GetCluster(50) will return $C_1$, and the record will consequently be stored on the first cluster. LevUpdateObject is almost identical, except that it requires the row to already exist.

LevCreateObject is called again to input Jane's record, which will lie in fragment 10101, on cluster $C_2$.

The final result of LevCreateObject is shown in TABLE 9 as follows:

TABLE 9

| Bases | | Table Contents... | | | |
|---|---|---|---|---|---|
| M1 and M2 | META_TABLE | Table | Create | Indices | Stored Procedures |
| | | SCHEMAS | XXXX | XXXX | XXXX |
| | OPEN_XACTS | XID | Table | Primary Key | |
| | COMMITTED_XACTS | XID | Table | Primary Key | |
| | BINARY | Fragment | Status | Key_0 | Data |
| | SCHEMAS | Fragment 12 | Status C | Key_0 CustomersSchema | Data XXXX |
| | CUSTOMERS | Fragment 50 | Status C | Key_0 46215 | Data XXXX |
| M3 and M4 | META_TABLE | Table | Create | Indices | Stored Procedures |
| | | TABLES | XXXX | XXXX | XXXX |
| | OPEN_XACTS | ID | Table | Primary Key | |
| | COMMITTED_XACTS | ID | Table | Primary Key | |
| | BINARY | Fragment | Status | Key_0 | Data |
| | CUSTOMERS | Fragment 10101 | Status C | Key_0 91111 | Data XXXX |

LevRetrieveObject

LevRetrieveObject is used to retrieve the record associated with a known primary key, using the following format:

LevRetrieveObject(UserID, SchemaName, PrimaryKey)
e.g.,

LevRetrieveObject("Ecompany", "Customers", 91111)

This results in the following actions:

1. The API uses the GetFragment("Customers",91111) method to determine what fragment the data is stored in. The result is guaranteed to be the same forever for a particular primary key. Result: 10101.
2. The API consults SmartIP's GetCluster(10101) method to get the cluster on which the data resides. Result: $C_2$.
3. The API consults SmartIP's BaseLoadBalancer( ) method to choose a machine in $C_2$ to connect to. Result: either $DAL(A_1,M_3)$ or $DAL(A_1,M_4)$. Suppose it is the former.
4. The API invokes the DAL RetrieveObject("Customers", 91111, 10101) method.
5. The DAL's responsibility is to check that the fragment is indeed stored on the cluster, the schema exists, the object's creation has committed but any deletion or update has not. If the object exists, the DAL returns to the API the contents of the data field, which is in the systems's internal format for the object.
6. The API converts this internal object to its XML form as originally created and returns that to the user, e.g.:
XML=(XML code)

LevDeleteObject

LevDeleteObject is used to remove a record associated with a known primary key, using the following format:

LevDeleteObject(UserID, SchemaName, PrimaryKey)
e.g.,

LevDeleteObject("Ecompany", "Customers", 91111)

This results in the following actions:

1. The API consults SmartIP's UDLoadBalancer( ) method, which uses the cluster map and load information to select a UD box to connect to. The UDLoadBalancer returns a connection to one of the UDs, say $V_1$.
2. The API sends a message to the selected UD containing:
   a. The type of request (which is LevDeleteObject)
   b. SchemaName "Customers"
   c. PrimaryKey 91111
3. The UD, upon receiving the message, creates a new transaction identifier (XID) to open.
4. The UD consults SmartIP's GetFragment("Customers", 91111) method, to determine which fragment the schema would be stored in. It returns a fragment number of: 10101.
5. The UD consults SmartIP's GetCluster(Fragment) method to determine, from the fragment map, which cluster stores that fragment 10101. Result: $C_2$.
6. The UD consults SmartIP's GetDALs(Cluster) method to get a list of database access layer objects representing each base in the cluster. The DALs returned will be $DAL(V_1,M_3)$ and $DAL(V_1,M_4)$.
7. The DAL's responsibility is to check that the fragment is indeed stored on the cluster, the schema exists, the object exists, and there is no operation currently occurring on the object. If these tests are passed, the DAL records the transaction and associated changes, without committing them. There are many ways to do this. One way is to:
   a. Change the data's row status from "C" to "D", indicating that a delete is in progress but has not committed. Any retrieve operations make no distinction between "C" and "D", but no other operation that would change the data may begin.
   b. A row is added to the open transaction table.
8. The UD records the result (success or failure) of the DAL invocations as they complete. If all succeed, it then invokes the Commit(xid) method on each DAL. Otherwise, it invokes the Abort(xid) method. It is assumed that the commit method is invoked.
9. The purpose of the DAL Commit method is to replace the uncommitted data with committed data, and to release any data that is locked. This is done by deleting the data row and deleting the transaction from the OPEN_XACTS table.

LevQueryOpen

LevQueryopen is used to retrieve multiple objects that obey some constraint on one or more primary or secondary keys. The following query retrieves all records whose "Name" field starts with the letter "J", sorted by name, as shown in TABLE 10:

LevQueryOpen(UserID, SchemaName, QueryKeyName, QueryKeyValue, SortKeyName, ComparisonOp, SortOrder) e.g., LevQueryOpen("Ecompany", "Customers", "Name", "J%", "Name", LIKE, ascending)

TABLE 10

| ID (4-byte integer) | Name (variable-length character) |
|---|---|
| 91111 | Jane |
| 46215 | Joe |

This results in the following actions:
1. The API consults SmartIP's BaseLoadBalancer( ) method to choose a machine in each cluster to connect to.
2. In parallel, API invokes the DAL QueryObject( ) method on each cluster.
3. The DAL executes the query and returns the number of successful hits and a handle to the result set.
4. API saves the total number of hits and the handles to the result sets in an in-memory structure.
5. API returns a unique query id to the client. The query id is passed to the LevQueryNumObjects( ), LevQueryNextObject( ) and LevQueryClose( ) methods to identify the appropriate query.
6. LevQueryNumObjects( ) is used to retrieve the total number of hits for the query executed by LevQueryopen( ).
7. LevQueryNextObject( ) is used to scroll forward-only through all of the results in sorted order based on the sort specified in LevQueryOpen( ). The API converts the internal object to its XML form as originally created and returns that to the user.
8. LevQueryClose( ) cleans up any resources used by the query.

LevCreateBinary, LevUpdateBinary

A binary object can be created in the system to store binary data such as graphics or encrypted data. Upon creation, each binary object is given a globally unique binary identifier as its primary key. Every binary object has a row record in the "BINARY" table and, depending on the actual size of the binary object, the actual binary data is stored either as a data field on that row record in the "BINARY" table, or as a file on the file system. If the binary data is stored as an external file, the data field in the "BINARY" table records the pathname of the external file. The calls have the following form:

LevCreateBinary(UserID, BinaryData) e.g.,

LevUpdateBinary(UserID, BinaryData) e.g.,

LevCreateBinary("Ecompany", BinaryData)

The API first generates a globally unique binary identifier, say "{AC757492-25DB-11D4-8FC0-00C04F601EA0}" and invokes GetFragment("BINARY", "{AC757492-25DB-11D4-8FC0-00C04F601EA0}") to get some fragment (e.g., 10111). In response, GetCluster(10111) will return $C_2$, and the record will consequently be stored on the second cluster. LevUpdateBinary is almost identical, except that it requires the row to exist already. The API invokes the DAL CreateBinary("{AC757492-25DB-11D4-8FC0-00C04F601EA0}", 10111) method and it checks the size of the binary object and determine whether to store the actual data in the "BINARY" table or as an external binary file on the file system.

LevCreateBinary is called again to pass in the actual binary object.

The final result of LevCreateBinary is shown in TABLE 11, as follows:

TABLE 11

| Bases | Table Contents... | | | | |
|---|---|---|---|---|---|
| M1 and M2 | META_TABLE | Table | Create | Indices | Stored Procedures |
| | | SCHEMAS | XXXX | XXXX | XXXX |
| | OPEN_XACTS | XID | Table | Primary Key | |
| | COMMITTED_XACTS | XID | Table | Primary Key | |
| | BINARY | Fragment | Status | Key_0 | Data |
| | SCHEMAS | Fragment 12 | Status C | Key_0 CustomersSchema | Data XXXX |
| | CUSTOMERS | Fragment 50 | Status C | Key_0 46215 | Data XXXX |
| M3 and M4 | META_TABLE | Table | Create | Indices | Stored Procedures |
| | | TABLES | XXXX | XXXX | XXXX |
| | OPEN_XACTS | ID | Table | Primary Key | |
| | COMMITTED_XACTS | ID | Table | Primary Key | |
| | BINARY | Fragment 10111 | Status C | Key_0 {AC757492-25DB-11D4-8FC0-00C04F601EA0} | Data XXXX |
| | CUSTOMERS | Fragment 10101 | Status C | Key_0 91111 | Data XXXX |

LevRetrieveBinary

LevRetrieveBinary is used to retrieve the binary object associated with a known binary object identifier, and is called using the following format.

LevRetrieveBinary(UserID, BinaryIdentifier) e.g.,

LevRetrieveBinary("Ecompany", "{AC757492-25DB-11D4-8FC0-00C04F601EA0}")

This results in the following actions:
1. The API uses the GetFragment("BINARY", "{AC757492-25DB-11D4-8FC0-00C04F601EA0}") method to determine what fragment the data is stored in. The result is guaranteed to be the same forever for a particular binary object identifier. Result: 10111.
2. The API consults SmartIP's GetCluster(10111) method to get the cluster on which the data resides. Result: $C_2$.

3. The API consults SmartIP's BaseLoadBalancer( ) method to choose a machine in $C_2$ to connect to. Result: either $DAL(A_1,M_3)$ or $DAL(A_1,M_4)$. Suppose it is the former.
4. The API invokes the DAL RetrieveBinary("{AC757492-25DB-11D4-8FC0-00C04F601EA0}", 10111) method.
5. The DAL's responsibility is to check that the fragment is indeed stored on the cluster, the table exists, the object's creation has committed but any deletion or update has not.
6. If the object exists, the DAL retrieves to the API the contents of the binary data.

LevDeleteBinary

LevDeleteBinary is used to remove a binary object associated with a known binary object identifier, and has the following format:

LevDeleteBinary(UserID, BinaryIdentifier) e.g.,
LevDeleteBinary("Ecompany", "{AC757492-25DB-11D4-8FC0-00C04F601EA0}")

This results in the following actions:
1. The API consults SmartIP's UDLoadBalancer( ) method, which uses the cluster map and load information to select a UD box to connect to. The UDLoadBalancer returns a connection to one of the UDs, say $V_1$.
2. The API sends a message to the selected UD containing:
   a. The type of request (which is LevDeleteBinary)
   b. BinaryIdentifier "{AC757492-25DB-11D4-8FC0-00C04F601EA0}"
3. The UD, upon receiving the message, creates a new transaction identifier (XID) to open.
4. The UD consults SmartIP's GetFragment("BINARY", "{AC757492-25DB-11D4-8FC0-00C04F601EA0}") method, to determine which fragment the schema would be stored in. It returns a fragment number. Result: 10111.
5. The UD consults SmartIP's GetCluster(Fragment) method to determine, from the fragment map, which cluster stores that fragment 10111. Result: $C_2$.
6. The UD consults SmartIP's GetDALs(Cluster) method to get a list of database access layer objects representing each base in the cluster. The DALs returned will be $DAL(V_1,M_3)$ and $DAL(V_1,M_4)$.
7. The DAL's responsibility is to check that the fragment is indeed stored on the cluster, the table exists, the object exists, and there is no operation currently occurring on the object. If these tests are passed, the DAL records the transaction and associated changes, without committing them. There are many ways to do this, including:
   a. Change the data's row status from "C" to "D", indicating that a delete is in progress but has not committed. Any retrieve operations make no distinction between "C" and "D", but no other operation that would change the data may begin.
   b. A row is added to the open transaction table.
8. The UD records the result (success or failure) of the DAL invocations as they complete. If all succeed, it then invokes the Commit(xid) method on each DAL. Otherwise, it invokes the Abort(xid) method. It is assumed the commit method is invoked.
9. The purpose of the DAL Commit method is to replace the uncommitted data with committed data, and to release any data that is locked. This is done by deleting the data row and deleting the transaction from the OPEN_XACTS table.

NewCluster

Newcluster is the command used to add a new cluster to the configuration and is issued to the shepherd through a separate GUI tool or command-line tool. The command line version looks like:

newcluster N machine1 . . . machineN

The result is to add a new cluster to the configuration, with N machines in it. In addition, fragments are assigned to the cluster and the data in those clusters is migrated to those machines. All this is done while trying to minimize the loss of write service, and prevent any loss of read service. Consider what happens when the following command is entered:

newcluster 2 M5 M6

1. The command is packaged into a message and sent to the shepherd.
2. Initialization: the bases are initialized to empty, with empty system tables, indices, and stored procedures.
3. Configuration: the shared cluster map is adjusted to the state below. Since a copy of the cluster map is maintained on each virtual transaction layer machine and each client machine, as well as the shepherd and the persisted configuration database, this takes several steps.
   a. First the local copy is changed.
   b. Next the persisted configuration database is changed. The configuration database is a database in the RDBMS. In order to make it recoverable it is replicated on all bases in cluster $C_1$. The usual LevUpdateObject path is used to simplify this; in addition, the system forces the configuration tables to be on fragment 0, which is in turn forced to remain on cluster $C_1$.
   c. Then a message is sent to each UD process on a virtual transaction layer machine, and the client machines with the new cluster map, as shown below in TABLE 12.

TABLE 12

| Cluster | Count | Base | IP Address | State |
|---|---|---|---|---|
| 1 | 2 | M1 | 255.255.255.119 | Running |
|   |   | M2 | 255.255.255.100 | Running |
| 2 | 2 | M3 | 255.255.255.124 | Running |
|   |   | M4 | 255.255.255.121 | Running |
| 3 | 2 | M5 | 255.255.255.103 | Running |
|   |   | M6 | 255.255.255.101 | Running |
| Number of clusters: | 3 | | | |
| Number of UDs: | 1 | | | |
|   |   | UD1 | 255.255.255.101 | Running |

4. Population: at this point, the bases and the cluster are a live part of the system instance. However, as they have no data on them, and no fragments assigned to them, their databases will be empty and idle, except for answering "no data" to LevQueryXXXX requests. The population transfers a range of fragments from $C_1$ and $C_2$ to $C_3$ to balance out the workload. Cluster $C_1$ and $C_2$ will each transfer ⅓ of their fragments to $C_3$. $C_1$ will transfer fragment range [5461,8191], and $C_2$ will shed [13653, 16384]. A range is then broken into smaller ranges. Under the current implementation, a fixed maximum number of fragments are transferred at a time. The smaller ranges are processed as follows. A machine in the source cluster, say $M_1$, is chosen to be the primary source.
   a. Lock fragments: By means of a message and response to all UDs, the range of fragments is marked as LOCKED. This prevents any data on that range from being deleted, updated, or created (i.e., "write traffic"). Meanwhile, write traffic to other ranges are permitted. In addition, read traffic (query and retrieve) are unaffected, since they do not involve the UDs. This is done by means of a fragment lock structure, which is very small relative to the number of fragments.
   b. System tables: The entire contents of the system tables are read out of $M_1$ to a file using Sequel Server's BCP application programming interface. They are then read in to $M_5$ and $M_6$.

c. User tables: each user table is created on $M_5$ and $M_6$ in case it does not exist already, using the create statement stored in the create column of $M_1$'s metatable.

d. User data: All data in user tables are tagged with a fragment column. The rows whose fragment numbers are in the range on $M_1$ are read out to a file and read into the like-named table on $M_5$ and $M_6$.

e. Ancillary structures: each index and stored procedure in $M_1$'s META_TABLE is recreated on $M_5$ and $M_6$.

f. Fragment maps: all fragment maps on bases are updated via a special-purpose transaction mechanism. A UD is selected using SmartIPs LoadBalanceUDs method. This UD is sent a fragment map reassignment message indicating the source and destination clusters, and the highest and lowest fragment numbers in the range. This UD chooses a unique transaction ID, and invokes the DAL ReassignFragments method for each base in the source and destination clusters, and cluster 1 (which maintains a complete, correct map), in much the same way as in LevCreateSchema above. The DAL records the change as uncommitted, using stored procedures. If they all return success, then the UD invokes the commit method on all involved DALs, otherwise the abort method.

g. Release fragments: By means of another message and response to all UDs, all fragments LOCKED are returned to their normal UNLOCKED state. This message has the side-effect of changing the fragment map of the UDs when the entire transfer has been successful.

The resulting updated fragment map is shown in TABLE 13:

TABLE 13

| Fragment | Cluster |
|---|---|
| 0 | 1 |
| 1 | 1 |
| ... | ... |
| 2*MAX_FRAGMENTS/6 - 1 | 1 |
| 2*MAX_FRAGMENTS/6 | 3 |
| ... | |
| 3*MAX_FRAGMENTS/6 - 1 | 3 |
| 3*MAX_FRAGMENTS/6 | 2 |
| ... | |
| 5*MAX_FRAGMENTS/6 - 1 | 2 |
| 5*MAX_FRAGMENTS/6 | 3 |
| ... | ... |
| 6*MAX_FRAGMENTS/6 - 1 | 3 |

Figure 9:
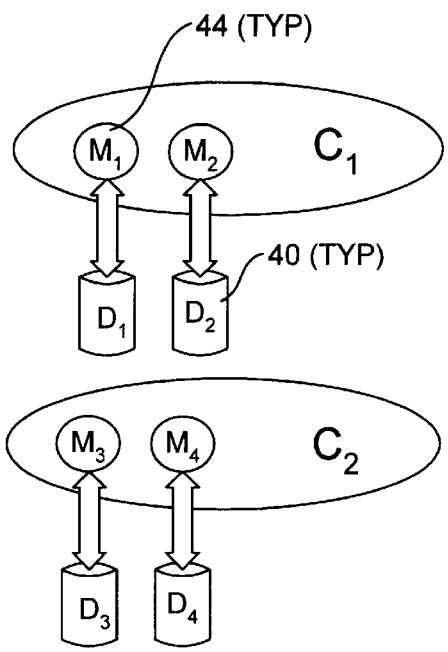
FIG. 9 is a schematic diagram and associated configuration table illustrating an initial configuration of an exemplary system prior to the system being incrementally scaled.
Figure 10:
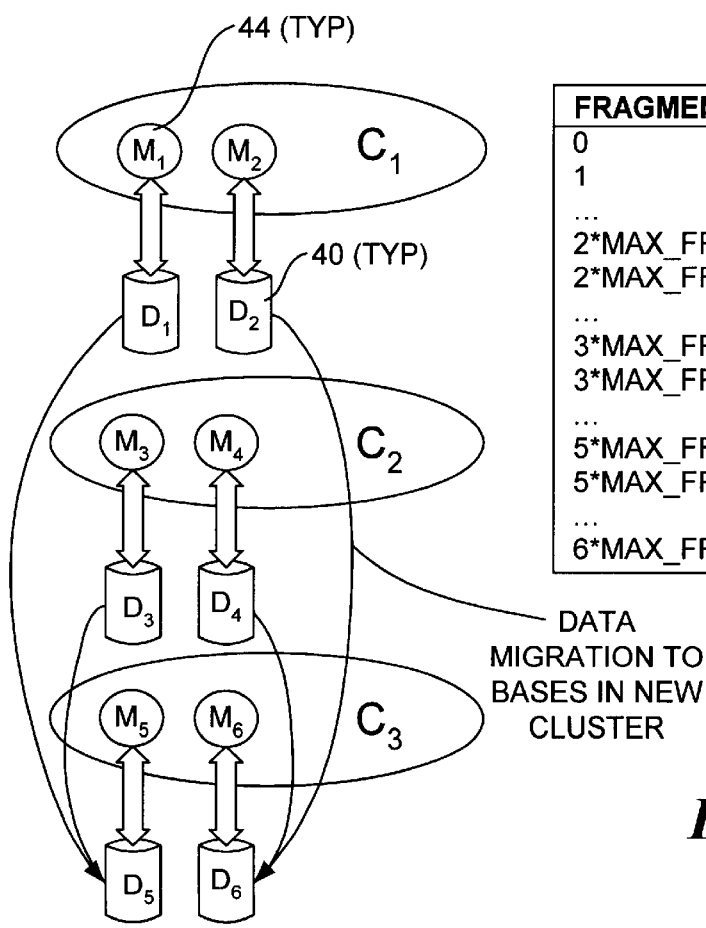
FIG. 10 is a schematic diagram and associated configuration table corresponding to the exemplary system of FIG. 9 after a new server cluster has been added to the system.

Adding a new cluster in accord with the foregoing description is graphically depicted in FIGS. 9 and 10. The cluster configuration and fragment map (TABLE 4) shown in FIG. 9 depicts the initial configuration of the system, while the cluster configuration and fragment map (TABLE 13) shown in FIG. 10 corresponds to the configuration of the system after cluster $C_3$ (which includes bases $M_5$ and $M_6$) has been added. Note that data is migrated from each of clusters $C_1$ (from either $M_1$ or $M_2$) and $C_2$ (from either $M_3$ or $M_4$) such that the data are (approximately) evenly distributed across all three clusters after the migration process is completed, in accord with the updated fragment map of FIG. 10.

NewNode

New nodes (i.e., base machines) are added to an existing cluster one at a time through a separate GUI tool or command-line tool. The command line version has the following format:

newnode <machine> <clusternumber>

The goal is to copy onto that machine a consistent, current set of the objects in the cluster with minimal loss of write service and no loss of read service. As in the NewCluster command, fragments are heavily used to organize the move. Consider the following example:

newnode M7 1

This results in the following actions:

1. The command is packaged into a message and sent to the shepherd.
2. Initialization: the base is initialized to empty, with empty system tables, indices, and stored procedures.
3. Configuration: the shared cluster map is adjusted to indicate that a new node is being brought into the system (i.e., "bootstrapped", as discussed above). To effect a change in the shared cluster map, the same sequence of steps is used as in NewCluster. The updated shared cluster map is shown below in TABLE 14.

TABLE 14

| Cluster | Count | Base | IP Address | State |
|---|---|---|---|---|
| 1 | 3 | M1 | 255.255.255.119 | Running |
| | | M2 | 255.255.255.100 | Running |
| | | M7 | 255.255.255.110 | Bootstrapping |
| 2 | 2 | M3 | 255.255.255.124 | Running |
| | | M4 | 255.255.255.121 | Running |
| 3 | 2 | M5 | 255.255.255.103 | Running |
| | | M6 | 255.255.255.101 | Running |
| Number of clusters: | 3 | | | |
| Number of UDs: | 1 | | | |
| | | UD1 | 255.255.255.101 | Running |

4. Population: at this point, the new base is in a special state. The client machines will not be notified about the change until the end. They can still process retrieve and query requests as though there was no $M_7$—they will just ask $M_1$ or $M_2$ for the data. However, write requests fall into one of three cases. As each range [x,y] of fragments is processed in turn, lowest to highest, some of the data will be on $M_7$ and some will not. Each UD, then, will check its fragment lock for each request to see which case it is in.

a. The data requested is on a fragment less than x. Process it on $M_1$, $M_2$, and $M_7$.
   b. The data is in the range [x,y]. Reject the request.
   c. The data is in a fragment greater than y. Process the request on $M_1$ and $M_2$, as the correct updated value will be copied to $M_7$ later.

A fixed maximum range size is currently implemented. A machine in the source cluster, say $M_1$, is chosen to be the primary source. This procedure:

a. Lock fragments: By means of a message and response to all UDs, the range of fragments is marked as LOCKED. This prevents any data on that range from being deleted, updated, or created (i.e., "write traffic"). Meanwhile, write traffic to other ranges are permitted. In addition, read traffic (query and retrieve) are unaffected, since they do not involve the UDs. This is performed by means of a fragment lock structure, which is very small relative to the number of fragments. This has the side effect of informing each UD which fragments are in which of the three cases above.
   b. System tables: The entire contents of the system tables are read out of $M_1$ to a file using Sequel Server's BCP application programming interface. They are then read into $M_7$.

c. User tables: each user table on $M_1$ is created on $M_7$ using the creation column of the META_TABLE.

d. User data: All data in user tables have a fragment column. The rows whose fragment numbers are in the range on $M_1$ are read out to a file and read into the like-named table on $M_7$.

e. Ancillary structures: each index and stored procedure in $M_1$'s META TABLE is recreated on $M_7$.

f. Release fragments: By means of another message and response to all UDs, all fragments LOCKED are returned to their normal UNLOCKED state. This message has the side-effect of changing the fragment map of the UDs when the entire transfer has been successful.

g. Go to step d with the next range.

Figure 11:
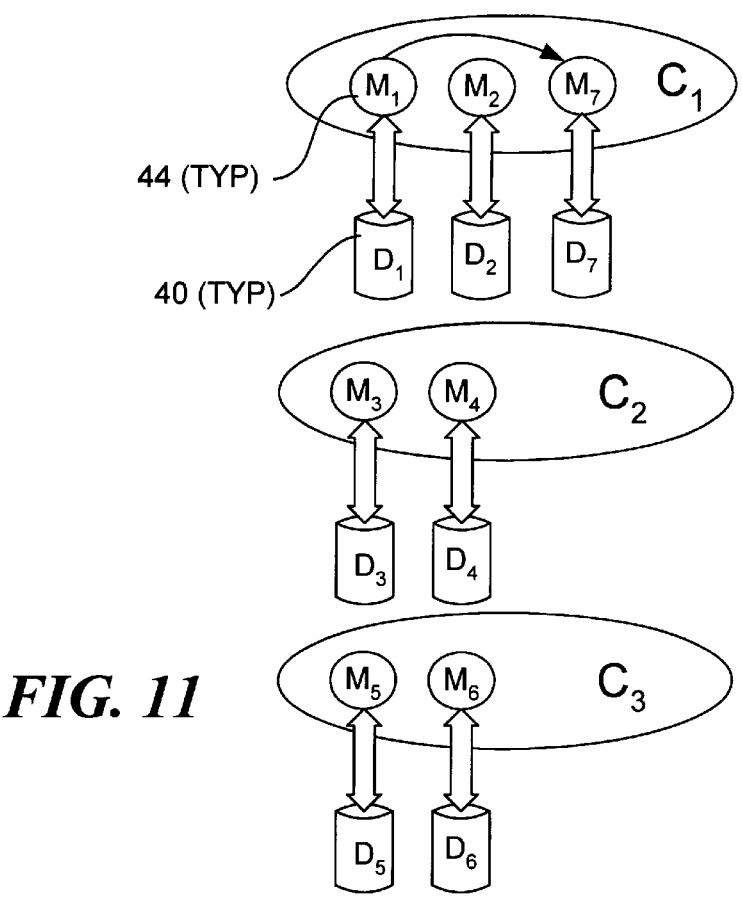
FIG. 11 is a schematic diagram illustrating the exemplary system of FIGS. 9 and 10 after a new computer server has been added to one of the system's server clusters.

The addition of new base $M_7$ (i.e., the new node) is graphically depicted in FIG. 11. Note that the addition of a new node does not alter the fragment map, but rather alters the cluster map, which is broadcast to the API's in the system to enabling load balancing across all of the nodes in the cluster to which the new node is added (i.e., cluster $C_1$ in this instance).

Minimum System Configuration for Providing Read Transaction Load Balancing

Figure 12:
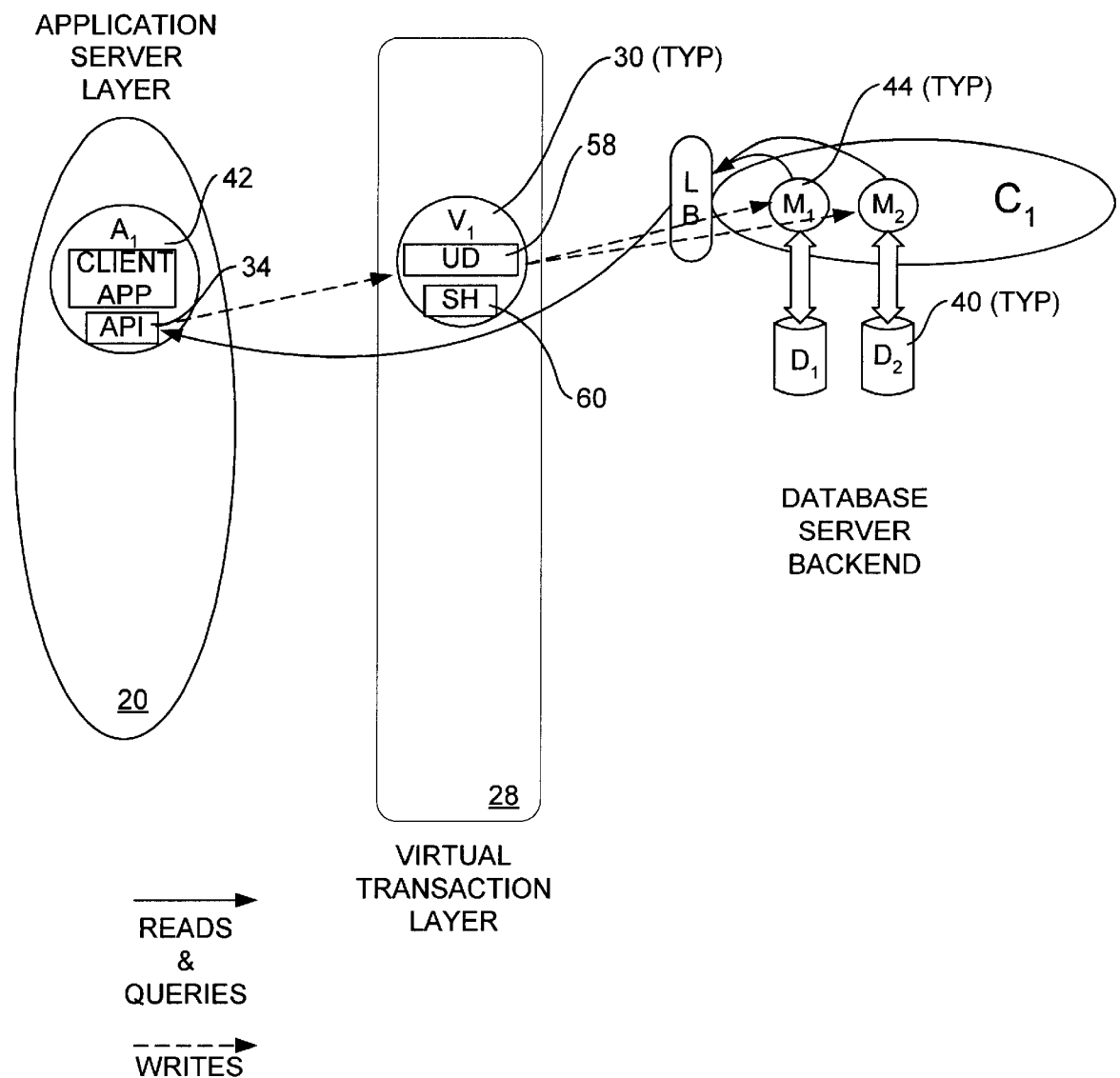
FIG. 12 shows a minimum system configuration for providing read transaction balancing in accord with the present invention.

FIG. 12 shows a minimum system configuration for providing read transaction load balancing, comprising an single instance of a client application 42, a single virtual transaction node 30, and a single cluster $C_1$ including two bases 44 ($M_1$ and $M_2$), each respectively connected to a storage device 40. In this configuration, all of the database data are stored in cluster $C_1$, and read transactions are balanced across bases $M_1$ and $M_2$, each of which have an identical instance of the database. In this configuration, read transactions can be scaled by adding another base to cluster $C_1$, while write transactions can be scaled by adding a new cluster comprising at least one base.

Minimum System Configuration for Providing Write Transaction Load Balancing

Figure 13:
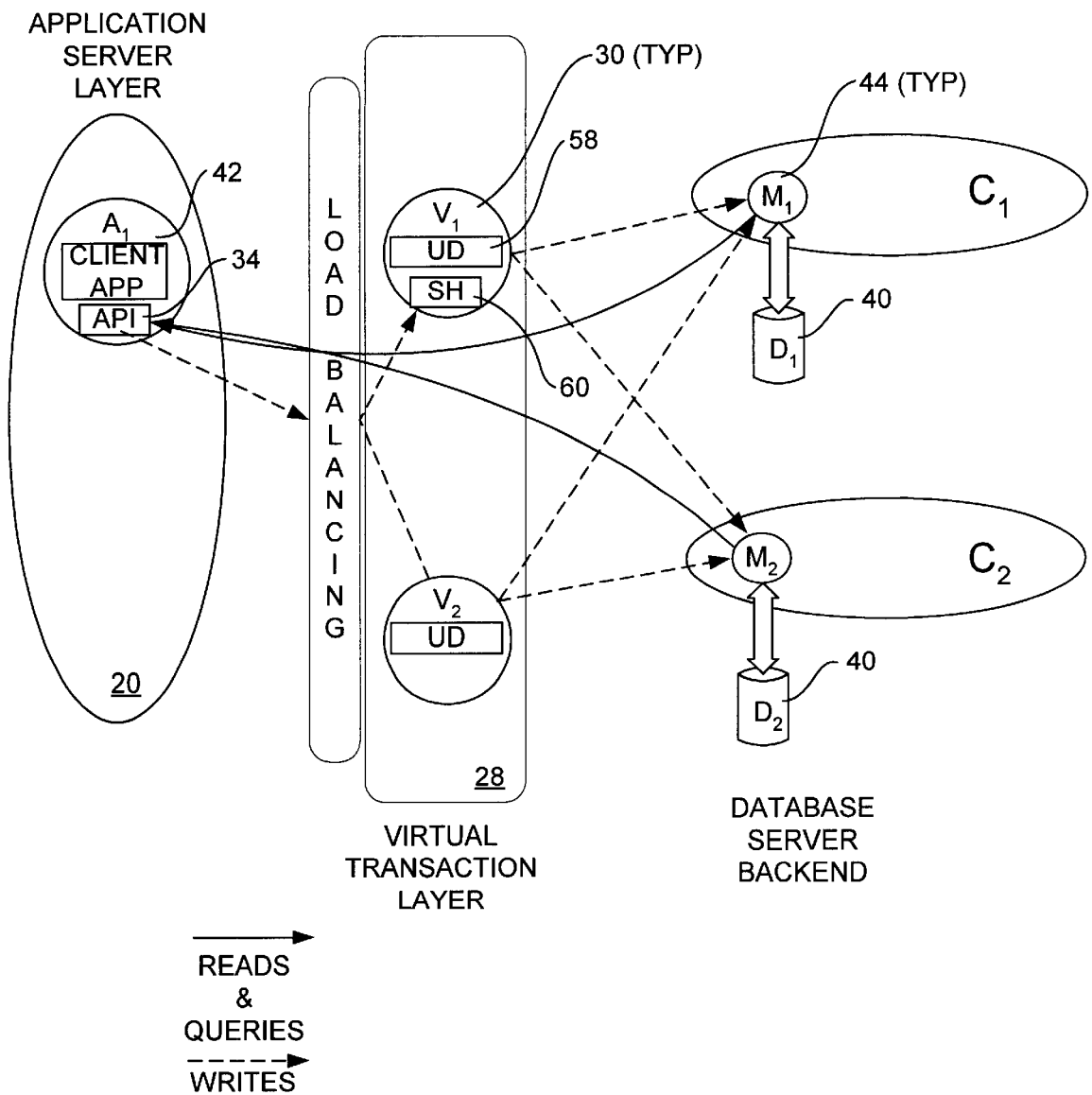
FIG. 13 shows a minimum system configuration for providing write transaction balancing in accord with the present invention.

FIG. 13 shows a minimum system configuration for providing write transaction load balancing, comprising an single instance of a client application 42, a pair of virtual transaction nodes 30 ($V_1$ and $V_2$), and a pair of clusters $C_1$ and $C_2$, each including a single base 44 ($M_1$ and $M_2$), wherein each base 44 is connected to a respective storage device 40. In this configuration, the database data are distributed across clusters $C_1$ and $C_2$, and write transactions are balanced across bases $M_1$ and $M_2$. Also, in this configuration, read transactions can be scaled by adding another base to either or both clusters $C_1$ and $C_2$, while write transactions can be scaled by adding a new cluster comprising at least one base.

Exemplary Computer System for use as Machines in Data Store System

Figure 14:
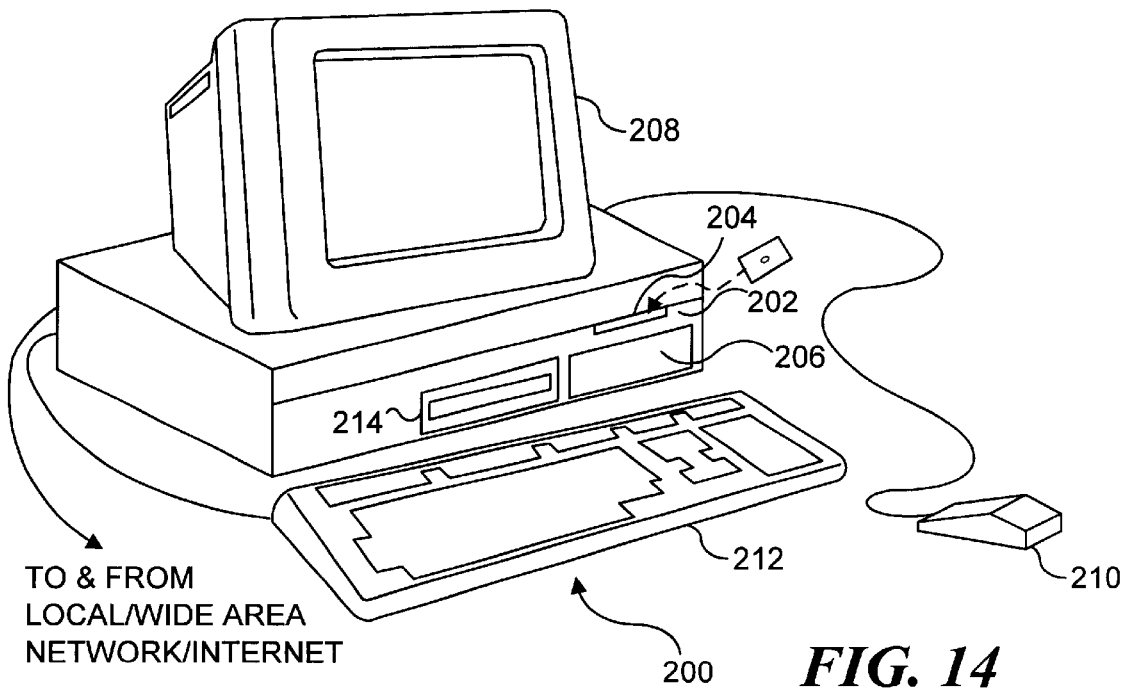
FIG. 14 is a schematic diagram of an exemplary computer server that may be implemented in the present invention.

With reference to FIG. 14, a generally conventional computer server 200 is illustrated, which is suitable for use in connection with practicing the present invention, and may be used for the various machines in the system. Alternatively, other similar types of computers may be used, including computers with multiple processors. Computer Server 200 includes a processor chassis 202 in which are mounted a floppy disk drive 204, a hard drive 206, a motherboard populated with appropriate integrated circuits (not shown) including memory and one or more processors, and a power supply (also not shown), as are generally well known to those of ordinary skill in the art. It will be understood that hard drive 206 may comprise a single unit, or multiple hard drives, and may optionally reside outside of computer server 200. A monitor 208 is included for displaying graphics and text generated by software programs and program modules that are run by the computer server, and for providing diagnostic information concerning the performance of each server. A mouse 210 (or other pointing device) may be connected to a serial port (or to a bus port or USB port) on the rear of processor chassis 202, and signals from mouse 210 are conveyed to the motherboard to control a cursor on the display and to select text, menu options, and graphic components displayed on monitor 208 by software programs and modules executing on the server computer. In addition, a keyboard 212 is coupled to the motherboard for user entry of text and commands that affect the running of software programs executing on the computer server. Computer server 200 also includes a network interface card (not shown) for connecting the computer server to a computer network, such as a local area network, wide area network, or the Internet Computer server 200 may also optionally include a compact disk-read only memory (CD-ROM) drive 214 into which a CD-ROM disk may be inserted so that executable files and data on the disk can be read for transfer into the memory and/or into storage on hard drive 206 of computer server 200. Other mass memory storage devices such as an optical recorded medium or DVD drive may be included. The machine instructions comprising the software program that causes the CPU to implement the functions of the present invention that have been discussed above will likely be distributed on floppy disks or CD-ROMs (or other memory media) and stored in the hard drive until loaded into random access memory (RAM) for execution by the CPU. Optionally, the machine instructions may be loaded via a computer network.

Although the present invention has been described in connection with a preferred form of practicing it and modifications thereto, those of ordinary skill in the art will understand that many other modifications can be made to the invention within the scope of the claims that follow.

Accordingly, it is not intended that the scope of the invention in any way be limited by the above description, but instead be determined entirely by reference to the claims that follow.

What is claimed is:

1. A method for incrementally scaling a database server system on which a database is served, comprising storing a plurality of database instances on a first server cluster comprising at least two computer servers, each having a duplicate copy of said database instance, said database instance comprising a database server application and data corresponding to the database, including metadata that defines a structure of the database and table data upon which database transactions are performed;

adding a second server cluster comprising at least two computer servers, each computer having installed thereon an instance of the database server application and the metadata;

migrating a portion of the table data from the first server cluster to the second server cluster by moving the portion of table data from each of said at least two computer servers in the first server cluster to said at least two computer servers in the second cluster while enabling database transactions on other portions of the table data remaining on the first server cluster, each of said at least two computer servers in the second cluster containing identical table data after the portion of the table data is migrated; and enabling database transactions across both the first and second clusters after the portion of table data has been migrated to said at least two computer servers in the second server cluster.

2. The method of claim 1, further comprising providing read transaction load balancing across each of the first and second server clusters such that read transactions corresponding to table data stored on a given server cluster are evenly distributed among the computer servers in that server cluster.

3. The method of claim 1, further comprising providing write transaction load balancing across the first and second server clusters after the portion of table data has been migrated such that write transactions are evenly distributed among the first and second server clusters.

4. The method of claim 1, further comprising:
adding a new computer server to one of the server clusters, said new computer server having installed thereon an instance of the database server application;
copying metadata and table data from at least one other computer server in the server cluster to which the new computer server is added so as to replicate the data from the other computer servers in the server cluster while enabling database transactions on the server cluster; and
distributing future database transactions across all computer servers, including the new computer server, in the server cluster to which the new computer server is added.

5. The method of claim 1, wherein the table data comprise a plurality of record objects, further comprising:
enabling a write transaction to add, modify or delete a record object on one of said first or second server clusters; and
processing the write transaction in substantial synchrony across all computer servers in the server cluster in which the data object is stored.

6. The method of claim 1, wherein the table data comprises a plurality of record objects, further comprising partitioning the table data by:
assigning each record object to a fragment; and
distributing record objects across each of the first, and second clusters based on the fragment each record object is assigned to.

7. The method of claim 6, wherein the record objects are assigned to fragments based on a hash function that operates on each record object.

8. The method of claim 6, further comprising providing fragment mapping data that maps each fragment to the server cluster on which its records are stored.

9. The method of claim 6, wherein migrating the portion of the table data from the first server cluster to the second server cluster comprises migrating at least one fragment of table data at a time while enabling database transactions on all other fragments of table data in the first server cluster.

10. The method of claim 9, wherein migrating the fragments of table data further comprises:
selecting a fragment of table data to be migrated;
writelocking the fragment of table data to prevent write transactions from being performed on record objects in the fragment of table data;
shipping the fragment of table data to each computer server in the second server cluster;
updating fragment mapping data to indicate the fragment of table data has been moved to the second cluster; and
releasing locks on the fragment of table data so as to re-enable write transactions to be performed on record objects in the fragment of table data.

11. The method of claim 10, further comprising:
rejecting transaction requests to access record objects corresponding to the fragment of table data while it is being shipped to the second server cluster; and
providing a message in accord with a rejected transaction request identifying that the fragment of table data now resides on the second server cluster.

12. The method of claim 1, wherein the database server system has an initial configuration comprising the first server cluster, further comprising:
determining if the portion of table data is successfully migrated to the second server cluster; and
restoring the database server system back to its initial configuration so as to enable database transactions on only the first server cluster if it is determined that the data was not successfully migrated to the second server cluster.

13. A method for incrementally scaling a database server system on which a database comprising table data is served, comprising
storing a first partition of table data on a first server cluster comprising at least two computer servers, each having a duplicate copy of said first partition of table data;
storing a second partition of table data on a second server cluster comprising at least two computer servers, each having a duplicate copy of said second partition of table data;
adding a third server cluster comprising at least two computer servers;
migrating portion(s) of table data stored on the first and/or second server clusters to the third server cluster while enabling database transactions on other portions of table data remaining on the first and second server clusters; and
enabling database transactions across all of the first, second and third server clusters after the portions of table data have been migrated to the third server cluster.

14. The method of claim 13, further comprising providing read transaction load balancing across each server cluster such that read transactions are evenly distributed among the computer servers in that server cluster.

15. The method of claim 13, further comprising providing write transaction load balancing across the server clusters in the system such that write transactions are evenly distributed among the server clusters.

16. The method of claim 13, further comprising:
adding a new computer server to one of the server clusters;
copying metadata and table data from another computer server in the server cluster to which the new computer server is added so as to replicate the table data on said another computer while enabling database transactions on the server cluster; and
distributing future database transactions across all computer servers, including the new computer server, in the server cluster to which the new computer server is added.

17. The method of claim 13, wherein the table data comprise a plurality of record objects, further comprising:
enabling a write transaction to add, modify or delete a record object on one of said first, second, or third server clusters; and
processing the write transaction in substantial synchrony across all computer servers in the server cluster in which the data object is stored.

18. The method of claim 13, wherein migrating the portion(s) of data to the third server cluster comprises copying fragments of data to all of said at least two computer servers in the third server cluster.

19. The method of claim 13, wherein the data comprises a plurality of record objects, further comprising partitioning the table data in the database by:

assigning each record object to a fragment; and distributing record objects across each of the first, second, and third clusters based on the fragment each record object is assigned to.

20. The method of claim 19, wherein the record objects are assigned to fragments based on a hash function that operates on each record object.

21. The method of claim 19, further comprising providing fragment mapping data that maps each fragment to the server cluster on which its records are stored.

22. The method of claim 19, wherein migrating the fragments of data to the third server cluster comprises creating any database tables and any associated indices and stored procedures relating to any fragments of data that are to be migrated on each computer server in the third cluster.

23. The method of claim 19, wherein migrating the portion(s) of table data to the third server cluster further comprises:

selecting a fragment of table data to be migrated;

writelocking the fragment of table data to prevent write transactions from being performed on record objects in the fragment of table data;

shipping the fragment of table data to each computer server in the third server cluster;

updating fragment mapping data to indicate the fragment of table data has been moved to the third cluster; and releasing locks on the fragment of table data so as to re-enable write transactions to be performed on record objects in the fragment of table data.

24. The method of claim 13, wherein the portion(s) of table data that are migrated originally resides on a source server cluster and shipping the portion(s) of data to each computer server in the third server cluster comprises:

copying the portion(s) of table data from a computer server in the source server cluster to each computer server in the third server cluster; and deleting the portion(s) of table data from all of the computer servers in the source server cluster.

25. The method of claim 23, wherein a plurality of fragments of table data are concurrently migrated to the computer servers in the third server cluster.

26. The method of claim 23, further comprising:

rejecting transaction requests to access record objects corresponding to the fragment of table data while it is being shipped to the third server cluster; and providing a message in accord with a rejected transaction request identifying that the fragment of table data now resides on the third server cluster.

27. The method of claim 13, wherein the database server system has an initial configuration comprising the first and second server clusters, further comprising:

determining if the portion(s) of table data is successfully migrated to the third server cluster; and restoring the database server system back to its initial configuration so as to enable database transactions on only the first and second server clusters if it is determined that the portion(s) of table data was not successfully migrated to the third server cluster.

28. The method of claim 13, further comprising providing an application program interface that enables an application program to perform transactions on record objects in the database without requiring the application program to consider where those record objects are stored on the database server system.

29. The method of claim 13, wherein the database comprises a database management system (DBMS) comprising a native interface language, further comprising providing an application program interface that enables an application program to interact with the database without directly using the native interface language of the DBMS.

30. A scalable database server system comprising:

(a) an application server layer comprising at least one application server computer on which an application program is running;

(b) a scalable database server layer including at least two server clusters on which a database comprising a plurality of record objects is served, each server cluster including at least one computer server, said plurality of record objects being distributed across said at least two server clusters based on an adaptive partitioning scheme;

(c) an intermediate layer disposed between and in communication with the application server layer and the database server layer comprising of one or more computers, each computer having a plurality of instructions executing thereon that enable the application program to perform write transactions on selected record objects stored on said at least two server clusters, whereby the write transactions are load balanced across said at least two server clusters.

31. The system of claim 30, wherein said database comprises an database management system (DBMS) having a native interface language, further including an application program interface (API) component comprising a plurality of executable instructions running on said at least one application server computer, said API component enabling the application program to interact with the database without directly using the native interface language of the DBMS.

32. The system of claim 31, wherein said plurality of record objects are partitioned into a plurality of fragments, each record object being assigned to a fragment, and further wherein the API component includes fragment mapping data that maps each fragment to the server cluster on which its records are stored.

33. The system of claim 30, further comprising a configuration management component that provides information concerning the configuration of the database server layer comprising a plurality of instructions executing on at least one of said at least two computers in the intermediate layer.

34. The system of claim 33, wherein said plurality of record objects are partitioned into a plurality of fragments, each record object being assigned to a fragment, and further wherein the configuration management component maintains fragment mapping data that maps each fragment to the server cluster on which its records are stored.

35. The system of claim 30, wherein the database data are partitioned into a plurality of fragments, whereby each record object is assigned to a fragment, and further wherein fragment mapping data is stored on each of said at least two server clusters such that each server cluster knows what record objects are stored on it.

36. The system of claim 30, wherein each server cluster comprises at least two computer servers and data is replicated across all of the computer servers in a given server cluster such that each computer server in the server cluster has an identical set of record objects stored thereon.

37. The system of claim 36, further including a load balancing module executing on said at least one application server computer that evenly distributes read transactions across said at least two computer servers in each server cluster.

38. The system of claim 30, wherein each computer server in each server cluster is connected in communication with a respective storage device on which data and computer executable instructions are stored in a shared-nothing configuration.

39. A scalable database server system comprising:
   (a) a scalable database server layer including at least one server cluster on which a database comprising a plurality of record objects is served, each of said at least one server cluster including at least two computer servers, each computer server in a given server cluster having a duplicative copy of at least a portion of said plurality of record objects stored thereon;
   (b) an intermediate layer in communication with the database server layer comprising at least one computer having a plurality of instructions executing thereon that manages a distribution of said plurality of record objects across said at least one server cluster; and
   (c) an application server layer in communication with the intermediate layer and the database server layer, comprising at least one application server computer on which an application program is running and including an application program interface (API) component comprising a plurality of executable instructions running on said at least one application server computer that enables interactions between the application program and the database, said API component providing load balancing of database read transactions across said at least two computer servers in each of said at least one server cluster.

40. The system of claim 39, wherein said database comprises an database management system (DBMS) having a native interface language, further wherein the API component enables the application program to interact with the database without directly using the native interface language of the DBMS.

41. The system of claim 39, further comprising a configuration management component that provides information concerning the configuration of the database server layer comprising a plurality of instructions executing on at least one of said at least one computers in the intermediate layer.

42. The system of claim 39, wherein each computer server in each server cluster is connected in communication with a respective storage device on which data and computer executable instructions are stored in a shared-nothing configuration.

43. A scalable datastore system comprising:
   (a) an application server layer comprising at least one application server computer on which an application program is running;
   (b) a scalable database server layer comprising at least two server clusters on which a database including a plurality of record objects are served, said plurality of record objects being distributed across said at least two server clusters, each server cluster including at least two computer servers having stored thereon identical sets of record objects;
   (c) an intermediate layer disposed between and in communication with the application server layer and the database server layer comprising at least two computers, at least one of said at least two computers having a configuration management component comprising a plurality of instructions executing thereon that provides information concerning the configuration of the database server layer including what server cluster each record object is stored on.

44. The system of claim 43, wherein said database comprises an database management system (DBMS) having a native interface language, further including an application program interface (API) component comprising a plurality of executable instructions running on said at least one application server computer, said API component enabling the application program to interact with the database without directly using the native interface language of the DBMS.

45. The system of claim 44, wherein said plurality of record objects are partitioned into a plurality of fragments, each record object being assigned to a fragment, and further wherein the API component includes fragment mapping data that maps each fragment to the server cluster on which its records are stored.

46. The system of claim 43, wherein said plurality of record objects are partitioned into a plurality of fragments, each record object being assigned to a fragment, and further wherein the configuration management component maintains fragment mapping data that maps each fragment to the server cluster on which its records are stored.

47. The system of claim 43, wherein the database data are partitioned into a plurality of fragments, whereby each record object is assigned to a fragment, and further wherein fragment mapping data is stored on each of said at least two server clusters such that each server cluster knows which fragments are assigned to the server cluster and which fragments are not.

48. The system of claim 43, further including a load balancing module executing on said at least one application server computer that evenly distributes read transactions across said at least two computer servers in each server cluster.

49. The system of claim 43, wherein each computer server in each server cluster is connected in communication with a respective storage device on which data and computer executable instructions are stored in a shared-nothing configuration.

50. The system of claim 43, wherein at least two of said at least two computers in the intermediate layer have stored thereon executable instructions comprising the configuration management component and a first instance of the configuration management component is executing on a first computer in the intermediate layer, and further wherein if execution of the configuration management component on the first computer is disrupted, execution of a second instance of the configuration management component automatically begins on another computer in the intermediate layer.

* * * * *